United States Patent
Conrad

(10) Patent No.: US 10,827,889 B2
(45) Date of Patent: Nov. 10, 2020

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 273 days.

(21) Appl. No.: 15/993,189

(22) Filed: May 30, 2018

(65) Prior Publication Data

US 2019/0365173 A1    Dec. 5, 2019

(51) Int. Cl.

| | |
|---|---|
| *B01D 45/12* | (2006.01) |
| *A47L 9/22* | (2006.01) |
| *A47L 9/20* | (2006.01) |
| *A47L 9/10* | (2006.01) |
| *A47L 5/24* | (2006.01) |
| *B01D 46/00* | (2006.01) |

(Continued)

(52) U.S. Cl.
CPC .............. *A47L 9/102* (2013.01); *B01D 45/16* (2013.01); *B01D 46/002* (2013.01); *B01D 50/002* (2013.01); *B01D 2279/55* (2013.01)

(58) Field of Classification Search
CPC .... B01D 46/002; B01D 50/002; B01D 45/16; B01D 2279/55; A47L 9/102; A47L 9/122; A47L 9/322; A47L 9/22; A47L 9/20; A47L 9/2884; A47L 5/24; A47L 9/10
USPC .... 55/459.1, 429, 433, DIG. 3; 15/347, 352, 15/353, 300.1
See application file for complete search history.

(56) References Cited

U.S. PATENT DOCUMENTS

| | | |
|---|---|---|
| 4,894,882 A | 1/1990 | Toya |
| 5,107,567 A | 4/1992 | Ferrari et al. |
| 5,230,722 A | 7/1993 | Yonkers |

(Continued)

FOREIGN PATENT DOCUMENTS

| | | |
|---|---|---|
| CN | 1506016 A | 6/2004 |
| CN | 1626025 A | 6/2005 |

(Continued)

OTHER PUBLICATIONS

TotalPatent: English machine translation of CN101288572; published on Oct. 22, 2008.

(Continued)

*Primary Examiner* — Minh Chau T Pham
(74) *Attorney, Agent, or Firm* — Philip C. Mendes da Costa; Bereskin & Parr LLP/S.E.N.C.R.L., s.r.l.

(57) ABSTRACT

A surface cleaning apparatus includes an air flow path, a filter housing, and a filter member in the filter housing. An air treatment member, a suction motor, and the filter housing are positioned in the air flow path. The filter member includes a plurality of individual filter elements arranged in parallel, each including porous filter material having at least one upstream face and at least one portion defining a porous filter media air outlet. The at least one upstream face has a larger surface area than the at least one portion. An outside gap is provided between at least some of the upstream faces and opposed facing walls of the filter housing, and an inside gap is provided between opposed upstream faces. A cross-sectional area of the outside gaps and the inside gaps is at least as large as a cross-sectional area of an air treatment member air inlet.

19 Claims, 39 Drawing Sheets

(51) Int. Cl.
*B01D 50/00* (2006.01)
*B01D 45/16* (2006.01)

(56) References Cited

U.S. PATENT DOCUMENTS

| | | |
|---|---|---|
| 6,113,663 A | 9/2000 | Liu |
| 6,129,550 A | 10/2000 | Culberson et al. |
| 6,406,505 B1 | 6/2002 | Oh et al. |
| 6,775,882 B2 | 8/2004 | Murphy et al. |
| 6,901,625 B2 | 6/2005 | Yang et al. |
| 7,335,242 B2 | 2/2008 | Oh |
| 7,488,362 B2 | 2/2009 | Jeong et al. |
| 7,540,894 B2 | 6/2009 | Ni |
| 7,645,309 B2 | 1/2010 | Jeong et al. |
| 7,708,789 B2 | 5/2010 | Fester |
| 7,887,612 B2 | 2/2011 | Conrad |
| 8,206,482 B2 | 6/2012 | Williams et al. |
| 8,544,143 B2 | 10/2013 | Hwang et al. |
| 8,997,309 B2 | 4/2015 | Conrad |
| 2001/0018865 A1 | 9/2001 | Wegelin et al. |
| 2002/0092119 A1 | 7/2002 | Vystrcil et al. |
| 2003/0084536 A1 | 5/2003 | Yung |
| 2006/0090290 A1 | 5/2006 | Lau |
| 2007/0033765 A1 | 2/2007 | Walker et al. |
| 2007/0067943 A1 | 3/2007 | Makarov |
| 2008/0178416 A1 | 7/2008 | Conrad |
| 2010/0236016 A1 | 9/2010 | Tran |
| 2010/0299866 A1 | 12/2010 | Conrad |
| 2011/0219570 A1 | 9/2011 | Conrad |
| 2011/0219575 A1 | 9/2011 | Conrad |
| 2012/0023701 A1 | 2/2012 | Lenkiewicz et al. |
| 2012/0304417 A1 | 12/2012 | Riley |
| 2013/0091660 A1 | 4/2013 | Smith |
| 2013/0091661 A1 | 4/2013 | Smith |
| 2013/0232722 A1 | 9/2013 | Conrad |
| 2014/0237768 A1 | 8/2014 | Conrad |
| 2016/0120382 A1 | 5/2016 | Conrad |
| 2017/0290479 A1* | 10/2017 | Conrad ............... A47L 9/1608 |
| 2017/0290481 A1* | 10/2017 | Conrad ............... A47L 5/24 |
| 2018/0303301 A1* | 10/2018 | Conrad ............... A47L 9/1641 |
| 2019/0290084 A1* | 9/2019 | Conrad ............... A47L 9/1666 |
| 2019/0320863 A1* | 10/2019 | Conrad ............... A47L 9/1666 |
| 2020/0022546 A1* | 1/2020 | Conrad ............... A47L 9/122 |
| 2020/0022547 A1* | 1/2020 | Conrad ............... A47L 5/16 |
| 2020/0046190 A1* | 2/2020 | Conrad ............... A47L 9/1683 |
| 2020/0077854 A1* | 3/2020 | Conrad ............... A47L 9/1683 |

FOREIGN PATENT DOCUMENTS

| | | |
|---|---|---|
| CN | 100998484 A | 7/2007 |
| CN | 101108106 A | 1/2008 |
| CN | 101108110 A | 1/2008 |
| CN | 201008534 Y | 1/2008 |
| CN | 101288572 A | 10/2008 |
| CN | 101288574 A | 10/2008 |
| CN | 201131706 Y | 10/2008 |
| CN | 101612025 A | 12/2009 |
| CN | 101822506 A | 9/2010 |
| CN | 202277306 U | 6/2012 |
| CN | 103040412 A | 4/2013 |
| CN | 103040413 A | 4/2013 |
| CN | 102256523 B | 11/2014 |
| DE | 10110581 C2 | 11/2003 |
| DE | 69907201 T2 | 2/2004 |
| DE | 10360002 A1 | 12/2004 |
| DE | 60116336 T2 | 8/2006 |
| DE | 102007011457 A1 | 10/2007 |
| DE | 102004055192 B4 | 11/2007 |
| DE | 102005015004 B4 | 2/2008 |
| DE | 102005008278 B4 | 3/2008 |
| DE | 102005014541 B4 | 8/2008 |
| DE | 112007001314 T5 | 4/2009 |
| DE | 202012101457 U1 | 8/2012 |
| DE | 112011104642 T5 | 10/2013 |
| DE | 112012000251 T5 | 10/2013 |
| EP | 1559359 A2 | 8/2005 |
| JP | 03176019 A | 7/1991 |
| JP | 2006272019 A | 10/2006 |
| JP | 2010227287 A | 10/2010 |
| KR | 1020040050174 A | 6/2004 |
| KR | 1020040088978 A | 10/2004 |
| KR | 1020050091821 A | 9/2005 |
| KR | 1020050091824 A | 9/2005 |
| KR | 1020050091826 A | 9/2005 |
| KR | 1020050091829 A | 9/2005 |
| KR | 1020050091830 A | 9/2005 |
| KR | 1020050091833 A | 9/2005 |
| KR | 1020050091834 A | 9/2005 |
| KR | 1020050091835 A | 9/2005 |
| KR | 1020050091836 A | 9/2005 |
| KR | 1020050091837 A | 9/2005 |
| KR | 1020050091838 A | 9/2005 |
| KR | 1020050103343 A | 10/2005 |
| KR | 1020050104613 A | 11/2005 |
| KR | 1020050104614 A | 11/2005 |
| KR | 1020050108623 A | 11/2005 |
| KR | 1020060008365 A | 1/2006 |
| KR | 1020060018004 A | 2/2006 |
| KR | 1020060112420 A | 11/2006 |
| KR | 1020060118795 A | 11/2006 |
| KR | 1020060118800 A | 11/2006 |
| KR | 1020060118801 A | 11/2006 |
| KR | 1020060118802 A | 11/2006 |
| KR | 1020060118803 A | 11/2006 |
| KR | 1020060119587 A | 11/2006 |
| KR | 1020060122249 A | 11/2006 |
| WO | 9930602 A2 | 6/1999 |
| WO | 2008070971 A1 | 6/2008 |
| WO | 2008070972 A1 | 6/2008 |
| WO | 2008070975 A1 | 6/2008 |

OTHER PUBLICATIONS

TotalPatent: English machine translation of CN101108110, published on Jan. 23, 2008.

TotalPatent: English machine translation of CN101108106; published on Jan. 23, 2008.

TotalPatent: English machine translation of CN100998484, published on Jul. 18, 2007.

TotalPatent: English machine translation of DE69907201, published on Feb. 5, 2004.

TotalPatent: English machine translation of DE60116336, published on Aug. 31, 2006.

TotalPatent: English machine translation of DE10360002; published on Dec. 16, 2004.

TotalPatent: English machine translation of DE10110581, published on Nov. 13, 2003.

TotalPatent: English machine translation of JP03176019, published on Jul. 31, 1991.

TotalPatent: English machine translation of CN1626025, published on Jun. 15, 2005.

Total Patent: English machine translation of CN1506016, published on Jun. 23, 2005.

English machine translation of KR1020060122249, published on Nov. 30, 2006.

English machine translation of KR1020060119587, published on Nov. 24, 2006.

English machine translation of KR1020060118803, published on Nov. 24, 2006.

English machine translation of KR1020060118802, published on Nov. 24, 2006.

English machine translation of KR1020060118801, published on Nov. 24, 2006.

English machine translation of KR1020060118800, published on Nov. 24, 2006.

English machine translation of KR1020060118795, published on Nov. 24, 2006.

English machine translation of KR1020060112420, published on Nov. 1, 2006.

(56) References Cited

OTHER PUBLICATIONS

English machine translation of KR1020060018004, Published on Feb. 28, 2006.
English machine translation of KR1020060008365, published on Jan. 26, 2006.
English machine translation of KR1020050108623, published on Nov. 17, 2005.
English machine translation of KR1020050104614, published on Nov. 3, 2005.
English machine translation of KR1020050104613, published on Nov. 3, 2005.
English machine translation of KR1020050103343, published on Oct. 31, 2005.
English machine translation of KR1020050091838, published on Sep. 15, 2005.
English machine translation of KR1020050091837, published on Sep. 15, 2005.
English machine translation of KR1020050091836, published on Sep. 15, 2005.
English machine translation of KR1020050091835, published on Sep. 15, 2005.
English machine translation of KR1020050091834, published on Sep. 15, 2005.
English machine translation of KR1020050091833, published on Sep. 15, 2005.
English machine translation of KR1020050091830, published on Sep. 15, 2005.
English machine translation of KR1020050091829, published on Sep. 15, 2005.
English machine translation of KR1020050091826, published on Sep. 15, 2005.
English machine translation of KR1020050091824, published on Sep. 15, 2005.
English machine translation of KR1020050091821, published on Sep. 15, 2005.
English machine translation of KR1020040088978, published on Oct. 20, 2004.
English machine translation of KR1020040050174, published on Jun. 16, 2004.
English machine translation of DE202012101457, published on Aug. 16, 2012.
English machine translation of DE112012000251, published on Oct. 17, 2013.
English machine translation of DE112011104642, published on Oct. 2, 2013.
English machine translation of DE112007001314, published on Apr. 23, 2009.
English machine translation of DE102007011457, published on Oct. 25, 2007.
English machine translation of DE102005015004, published on Feb. 7, 2008.
English machine translation of DE102005014541, published on Aug. 28, 2008.
English machine translation of DE102005008278, published on Mar. 27, 2008.
English machine translation of DE102004055192, published on Nov. 15, 2007.
English machine translation of JP2010227287, published on Oct. 14, 2010.
English machine translation of JP2006272019, published on Oct. 12, 2006.
English machine translation of CN202277306, published on Jun. 20, 2012.
English machine translation of CN201131706, published on Oct. 15, 2008.
English machine translation of CN201008534, published on Jan. 23, 2008.
English machine translation of CN103040413, published on Apr. 17, 2013.
English machine translation of CN103040412, published on Apr. 17, 2013.
English machine translation of CN102256523, published on Nov. 5, 2014.
English machine translation of CN101822506, published on Sep. 8, 2010.
English machine translation of CN101612025, published on Dec. 30, 2009.
International Search Report and Written Opinion, received in connection to international patent application No. PCT/CA2013/000121, mailed on.
Abstract of the Japanese Patent Application No. JP03176019A, as received in connection to International patent application No. PCT/CA2013/000121.
International Search Report which issued in connection to co-pending International Patent Application No. PCT/CA2019/05736, dated Jul. 24, 2019.

* cited by examiner

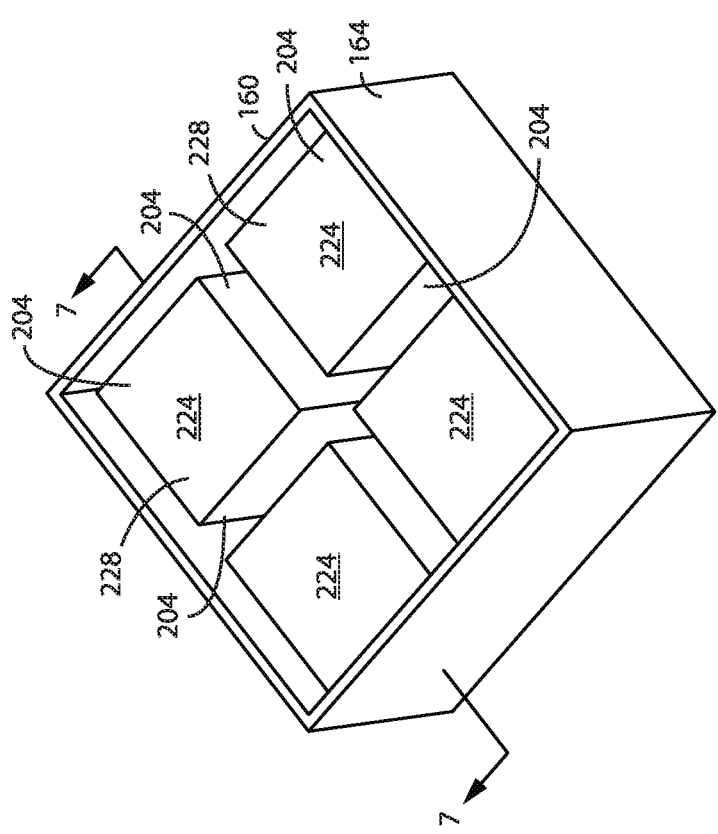

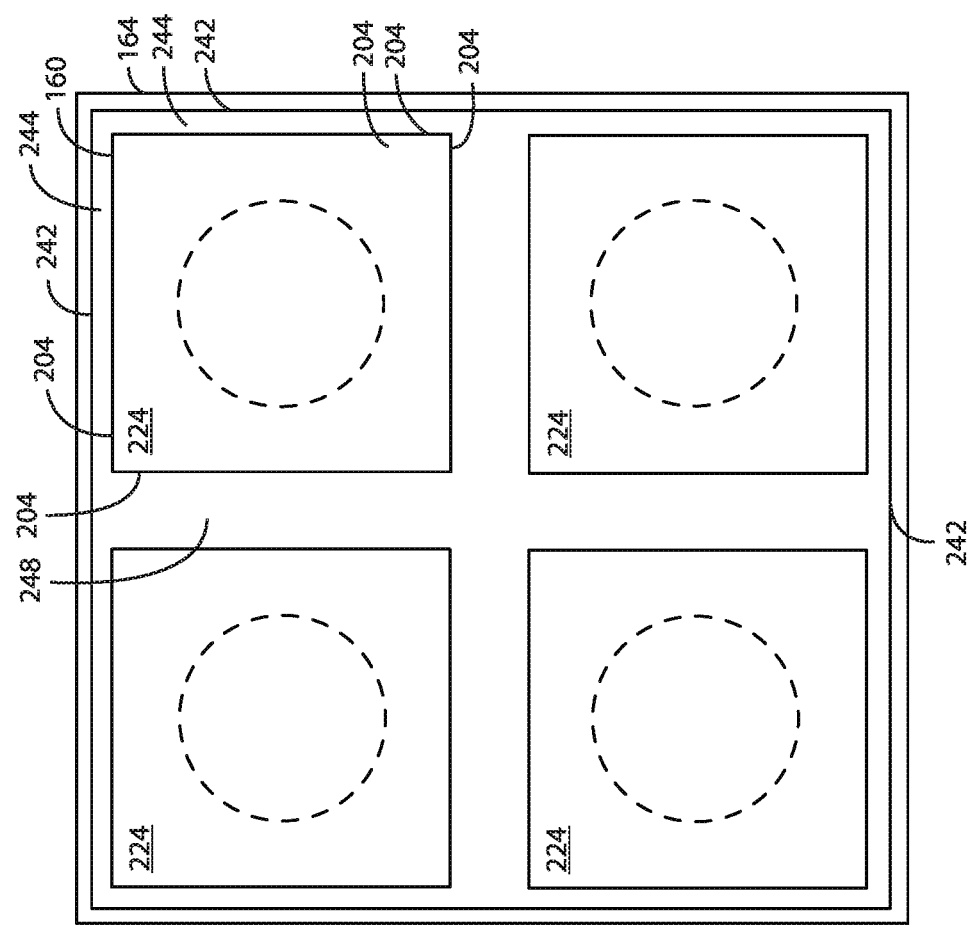

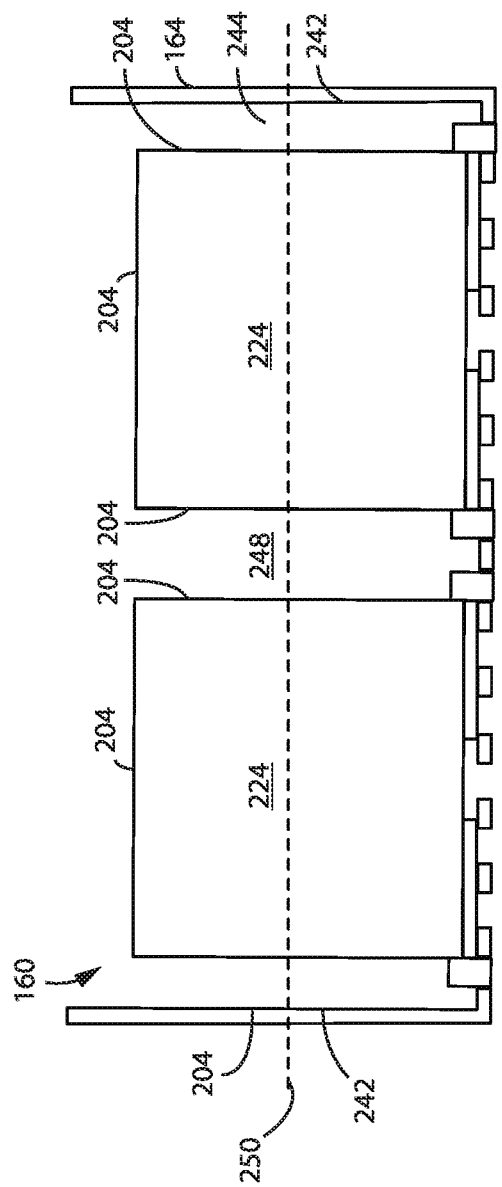

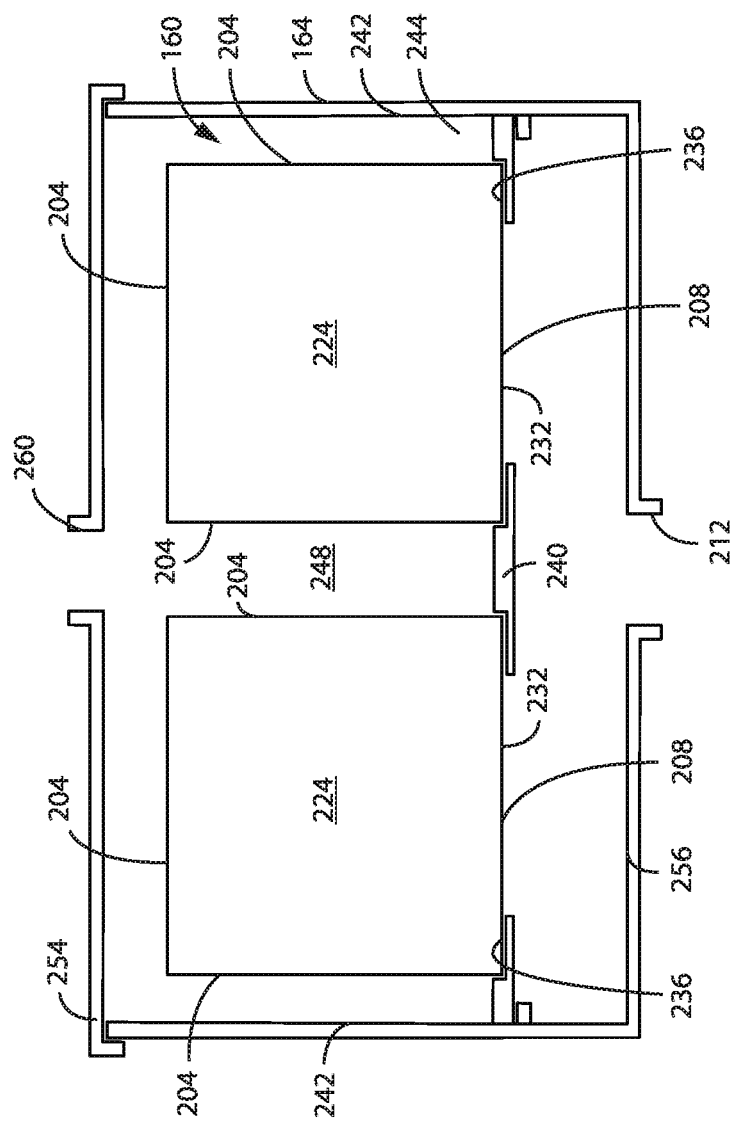

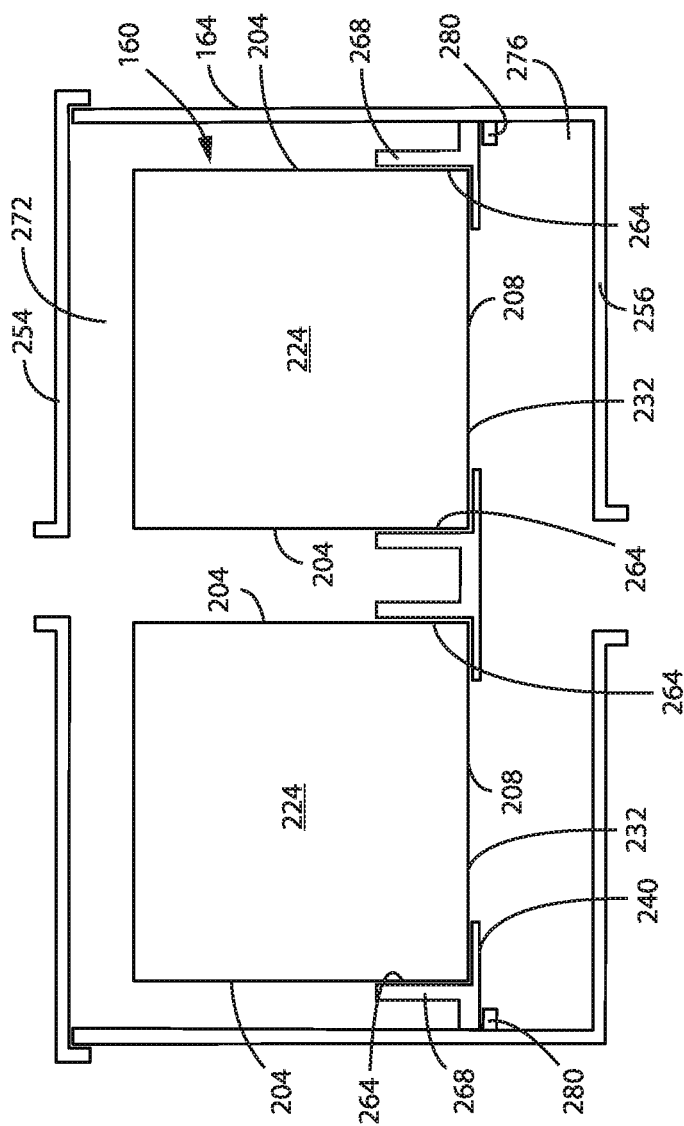

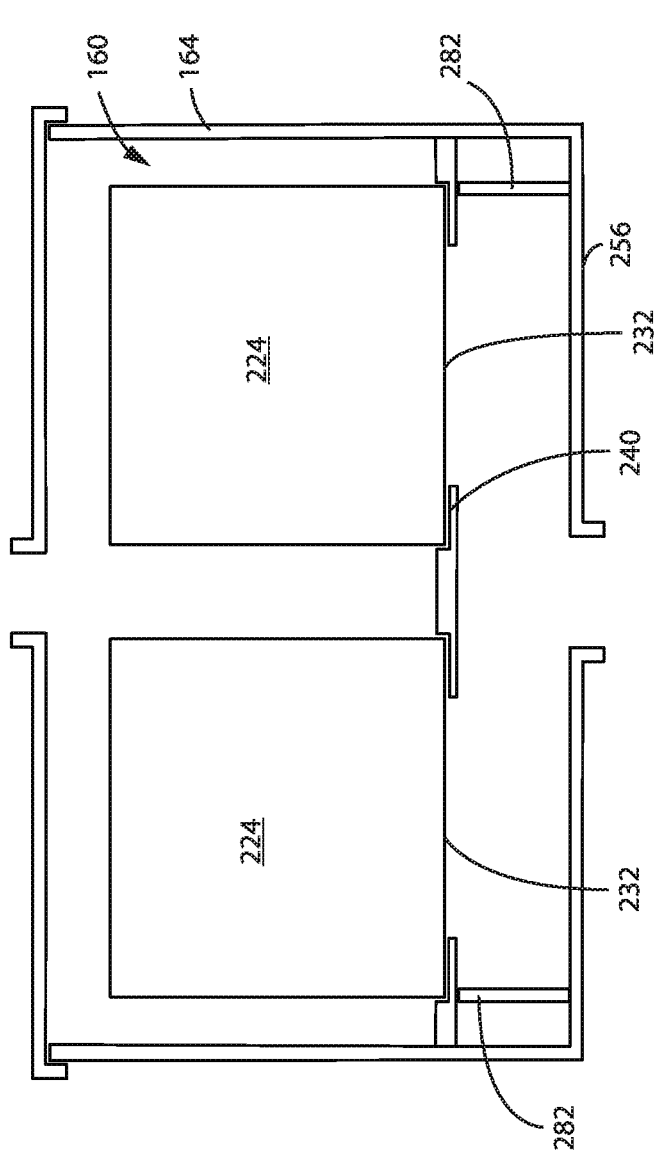

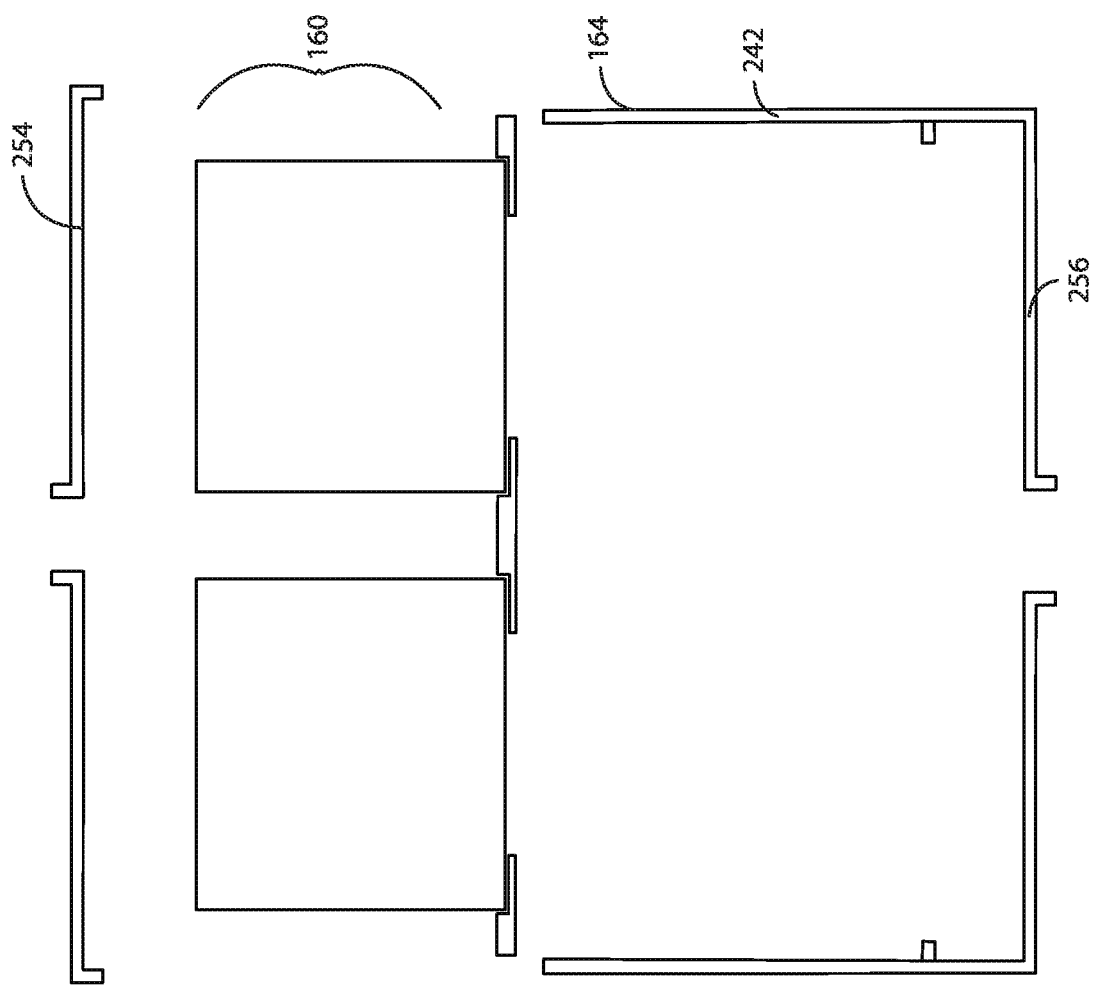

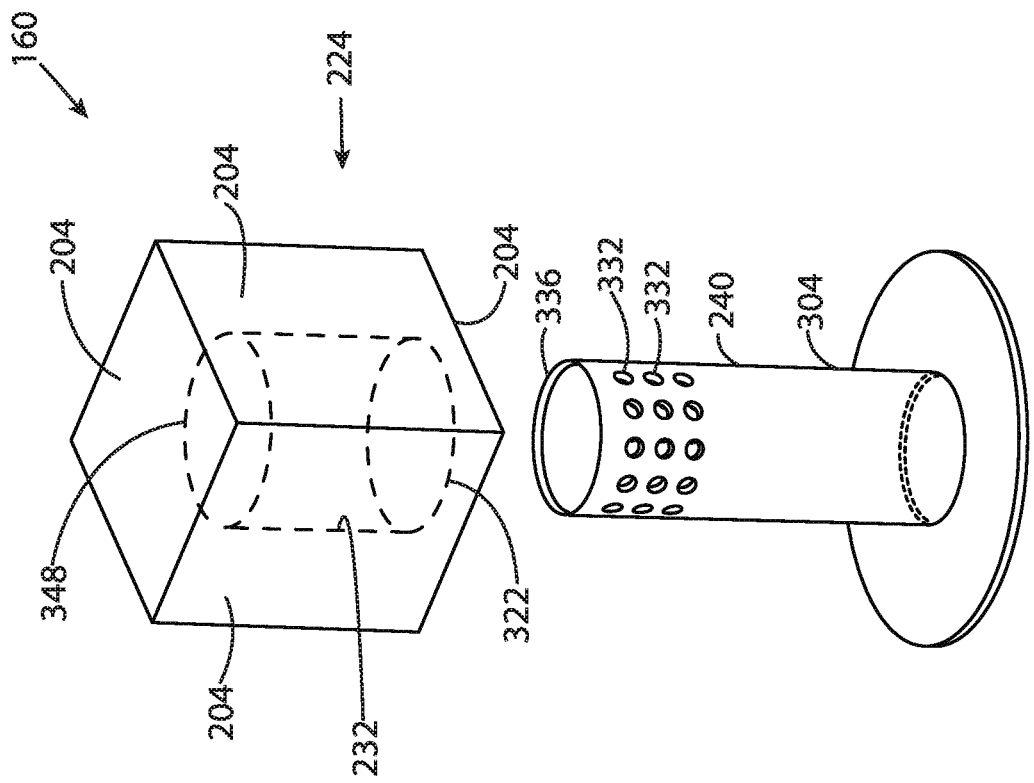
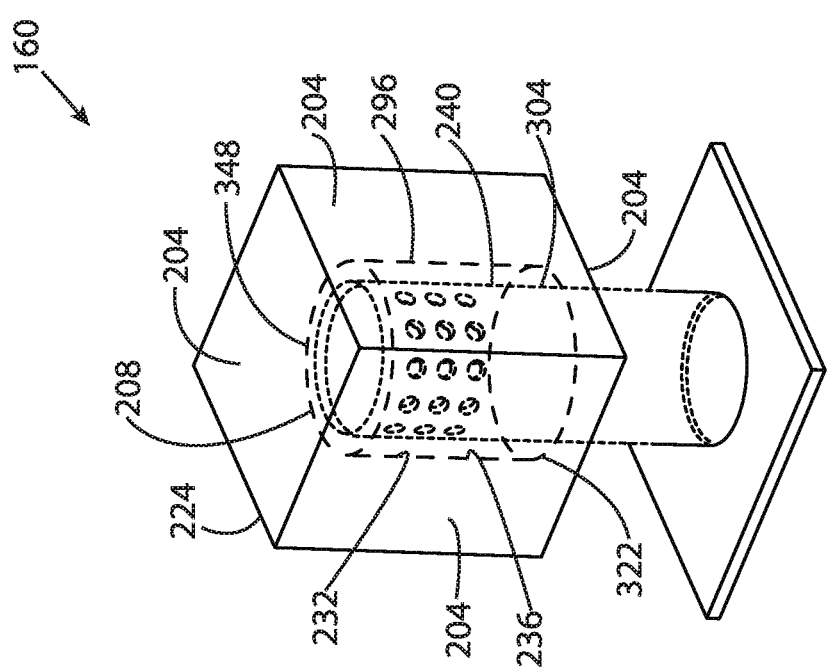

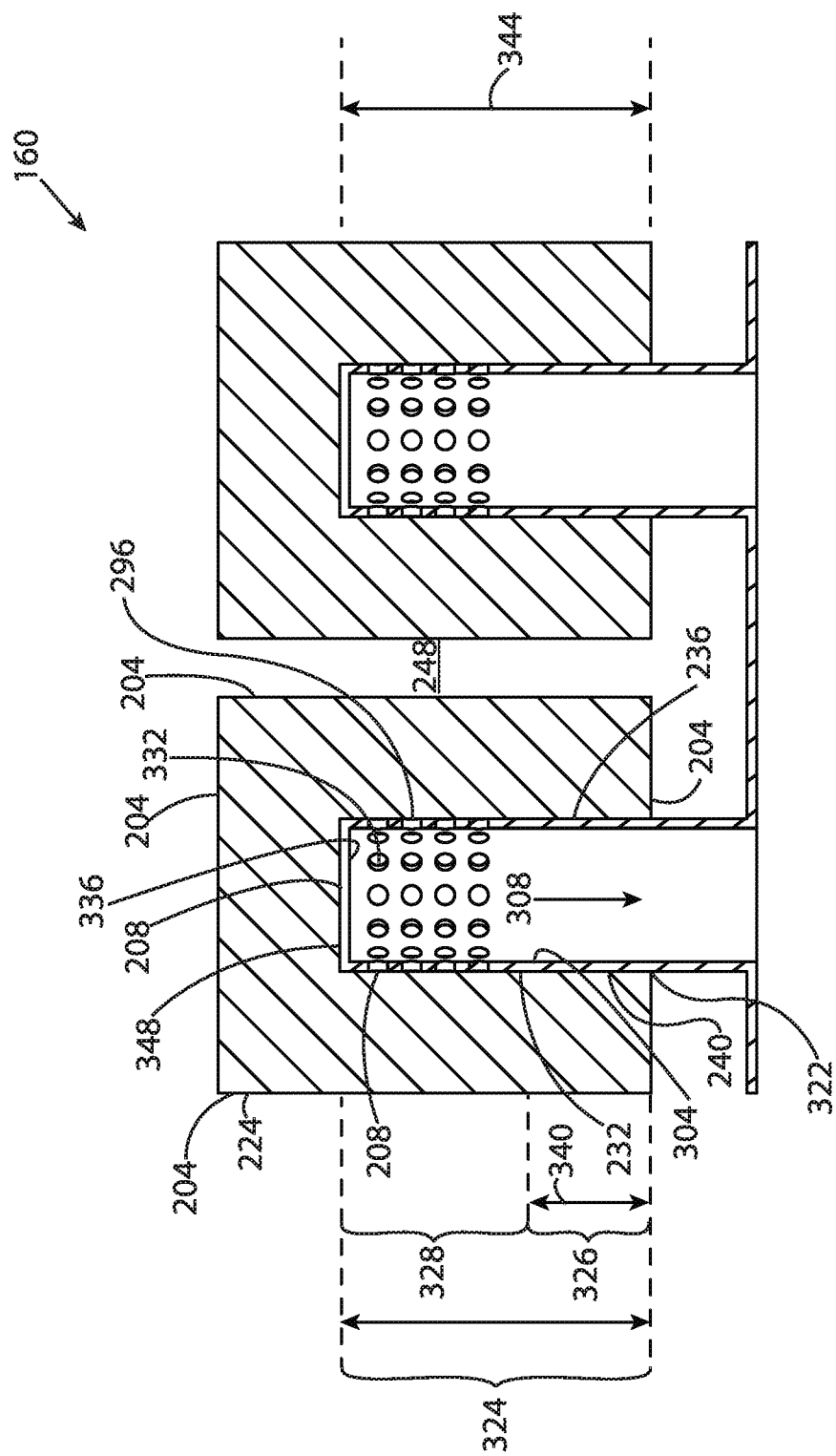

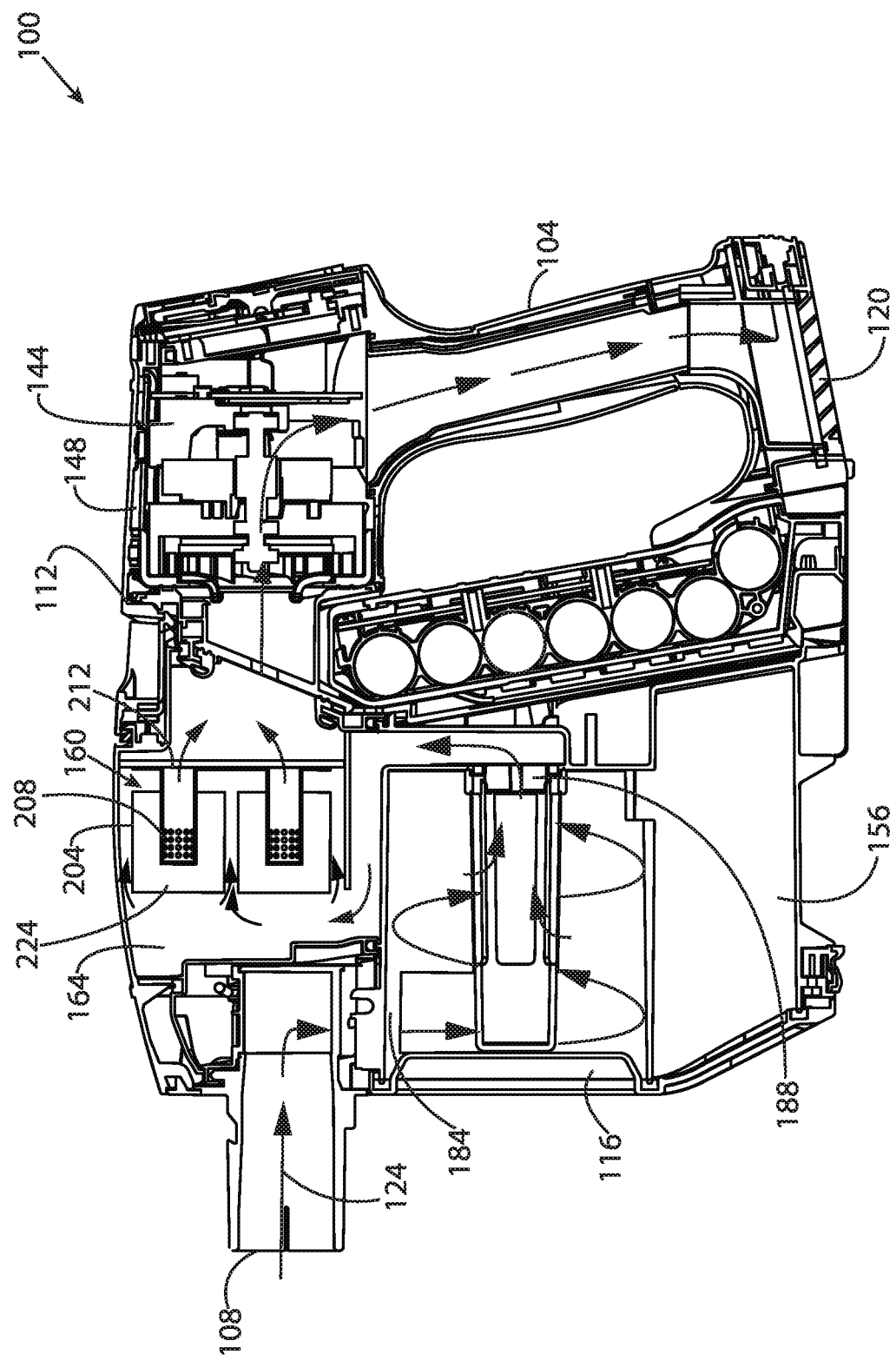

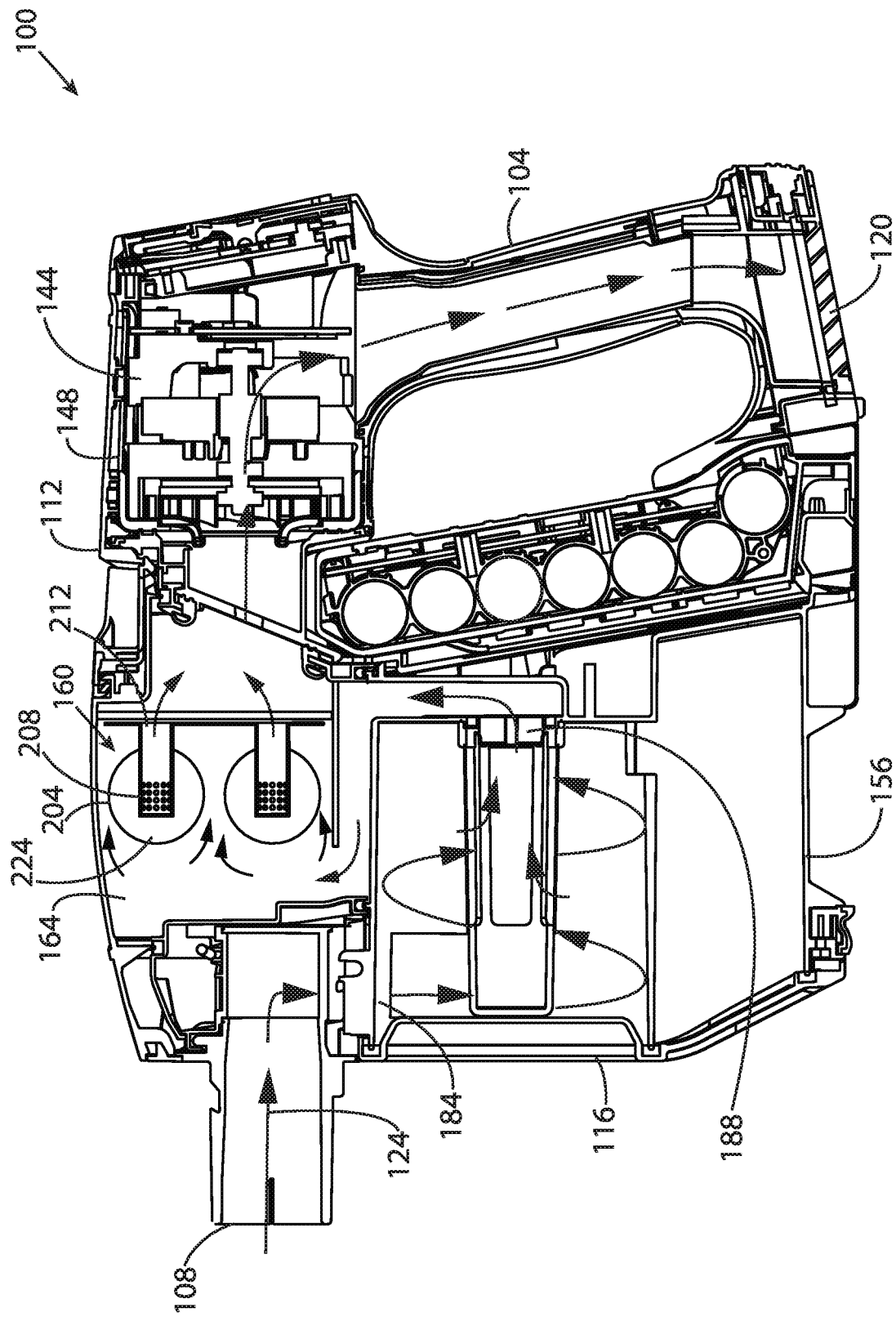

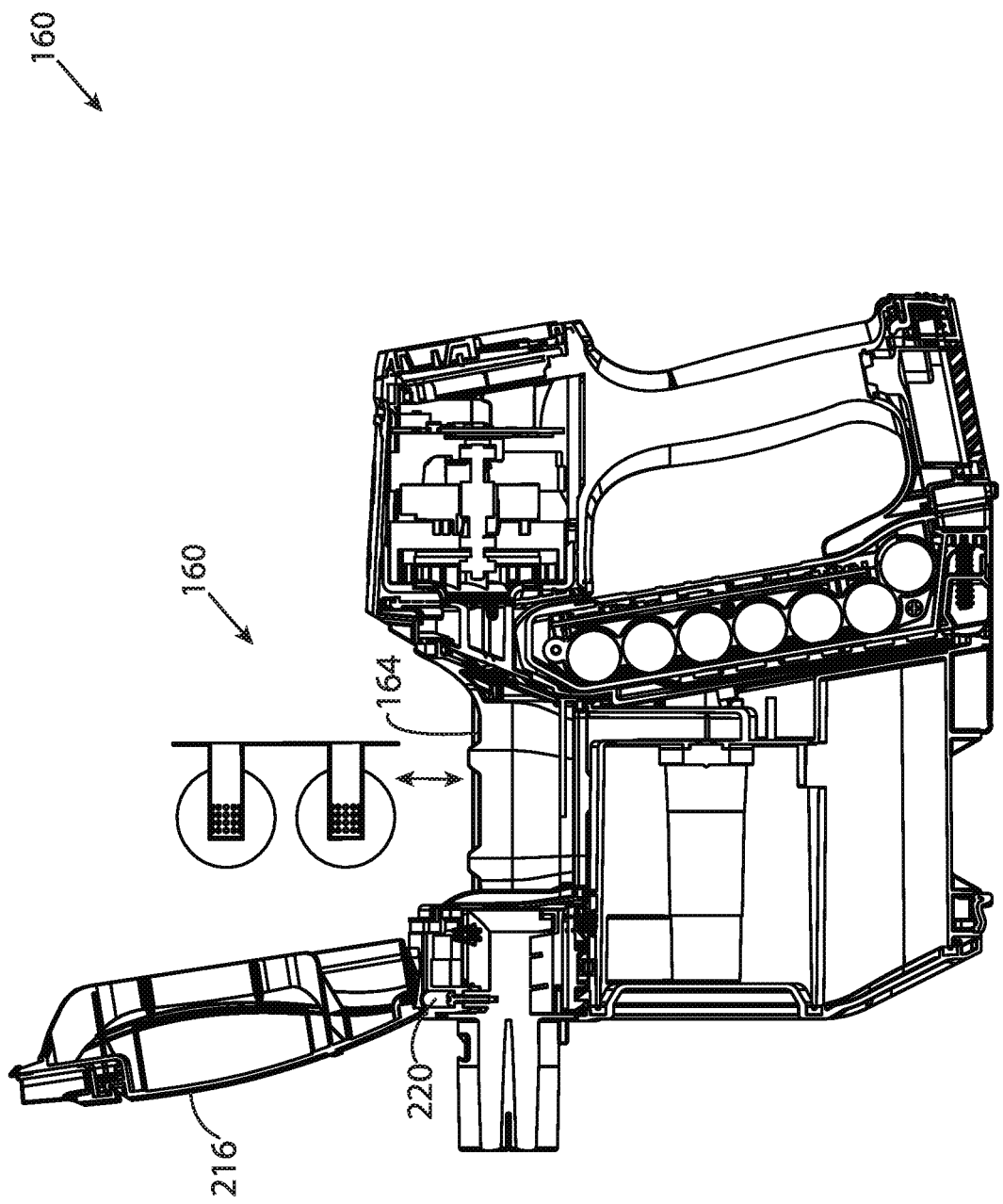

SURFACE CLEANING APPARATUS

FIELD

This disclosure relates generally to surface cleaning apparatus.

INTRODUCTION

The following is not an admission that anything discussed below is part of the prior art or part of the common general knowledge of a person skilled in the art.

Various types of surface cleaning apparatus are known. Such surface cleaning apparatus include vacuum cleaners, including upright vacuum cleaners, hand carryable vacuum cleaners, canister-type vacuum cleaners, extractors and wet/dry type vacuum cleaners (e.g. Shop-Vac™). Some vacuum cleaners include a cyclonic separator (also referred to as a cyclone bin assembly) having a cyclone chamber and a dirt collection chamber. A motor is used to draw air through the surface cleaning apparatus. A filter, such as a pre-motor filter, may be provided in the air flow path through the surface cleaning apparatus.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one aspect, a surface cleaning apparatus is provided wherein a filter assembly, which may be a pre-motor filter is provided. The filter assembly comprises a plurality of individual or discrete filter elements, which may be mounted on a common support member. The plurality of individual filter elements are spaced apart such that the side face of at least one individual filter element faces a side face of another individual filter element. The side faces are upstream faces of the filter assembly. An advantage of this design is that the upstream surface area of the filter assembly may be increased without increasing or substantially increasing the volume of the filter assembly.

In accordance with this aspect, there is provided a surface cleaning apparatus having an air flow path, a filter housing, and a filter member. The air flow path extends from a dirty air inlet to a clean air outlet, and an air treatment member and a suction motor are positioned in the air flow path. The filter housing is provided in the air flow path. The filter member is provided in the filter housing. The filter member comprises a plurality of individual filter elements arranged in parallel, each of the individual filter elements comprising porous filter material having at least one upstream face and at least one portion defining a porous filter media air outlet. The at least one upstream face has a larger surface area than the at least one portion. An outside gap is provided between at least some of the upstream faces and opposed facing walls of the filter housing and an inside gap is provided between opposed upstream faces. A cross-sectional area of the outside gaps and the inside gaps, in a plane transverse to a direction of air flow through the outside and inside gaps, is at least as large as a cross-sectional area of an air inlet to the air treatment member in a plane transverse to a direction of air flow through the air inlet to the air treatment member.

In some embodiments, the at least one portion may be provided on a single downstream face.

In some embodiments, only a portion of the single downstream face may be porous.

In some embodiments, an air impermeable material may be provided on a portion of the single downstream face.

In some embodiments, the at least one portion may be provided on the interior of the porous filter media and the porous filter media may have an air outlet passage extending in an air flow direction, the air outlet passage having a sidewall extending in the air flow direction and at least a portion of the air outlet passage being air impermeable.

In some embodiments, an air impermeable material may be provided on at least a portion of the sidewall of the air outlet passage.

In some embodiments, the air impermeable material may include a conduit inserted into the air outlet passage.

In some embodiments, an air impermeable material may be provided on a part of the porous filter media surrounding the porous filter media air outlet.

In some embodiments, at least some of the filter elements may have a plurality of upstream faces.

In some embodiments, at least some of the individual filter elements may be generally polyhedron in shape.

In some embodiments, at least some of the individual filter elements may be generally annular in transverse section and may be at least partially nested inside each other.

In accordance with this aspect, there is also provided a surface cleaning apparatus. The surface cleaning apparatus includes an air flow path and an individual filter element. The air flow path extends from a dirty air inlet to a clean air outlet. An air treatment member and a suction motor are positioned in the air flow path. The individual filter element includes a porous filter material having at a plurality of upstream faces and at least one portion defining a porous filter media air outlet. The at least one upstream face has a larger surface area than the at least one portion.

In some embodiments, the at least one portion may be provided on a single downstream face.

In some embodiments, only a portion of the single downstream face may be porous.

In some embodiments, an air impermeable material may be provided on a portion of the single downstream face.

In some embodiments, the at least one portion may be provided on the interior of the porous filter media and the porous filter media may have an air outlet passage extending in an air flow direction, the air outlet passage having a sidewall extending in the air flow direction and at least a portion of the air outlet passage being air impermeable.

In some embodiments, an air impermeable material may be provided on at least a portion of the sidewall of the air outlet passage.

In some embodiments, the air impermeable material may include a conduit inserted into the air outlet passage.

In accordance with another aspect, a filter for a surface cleaning apparatus, such as a pre-motor filter, may be subdivided into two or more sub-assemblies wherein each sub assembly comprises a plurality of individual or discrete filter elements, which may be mounted on a common support member.

In accordance with this aspect, there is provided a surface cleaning apparatus having an air flow path, a first filter part, and a second filter part. The air flow path extends from a dirty air inlet to a clean air outlet. An air treatment member and a suction motor are positioned in the air flow path. The first filter part includes a first plurality of individual filter elements in parallel and is located at a first location in the surface cleaning apparatus. The second filter part includes a second plurality of individual filter elements in parallel and is located at a second location in the surface cleaning apparatus. Each of the individual filter elements includes porous filter material having at least one upstream face and at least one portion defining a porous filter media air outlet. The at least one upstream face has a larger surface area than the at least one portion.

In some embodiments, at least some of the individual filter elements may be generally polyhedron in shape.

DRAWINGS

FIG. 4 is a top perspective view of a filtration assembly including a filter member in a filter housing;

FIG. 6 is a top plan view of the filtration assembly of FIG. 4;

FIG. 7 is a cross-sectional view taken along line 7-7 in FIG. 4, in accordance with an embodiment;

FIG. 8 is a cross-sectional view of a filtration assembly in accordance with another embodiment;

FIG. 9 is a cross-sectional view of a filtration assembly in accordance with another embodiment;

FIG. 10 is a cross-sectional view of a filtration assembly in accordance with another embodiment;

FIG. 11 is an exploded view of the filtration assembly of FIG. 8;

FIG. 27 is a perspective view of a filter member in accordance with another embodiment;

FIG. 28 is an exploded view of the filter member of FIG. 27;

FIG. 31 is a cross-sectional view taken along line 31-31 in FIG. 30;

FIG. 32 is a cross-sectional view of a surface cleaning apparatus including the filter member of FIG. 29;

FIG. 44 is a cross-sectional view of a surface cleaning apparatus including the filter member of FIG. 41; and FIG. 45 is a cross-sectional view of the surface cleaning apparatus of FIG. 44, with a filter housing opened and the filter member removed, in accordance with an embodiment.

DESCRIPTION OF VARIOUS EMBODIMENTS

Figure 1:
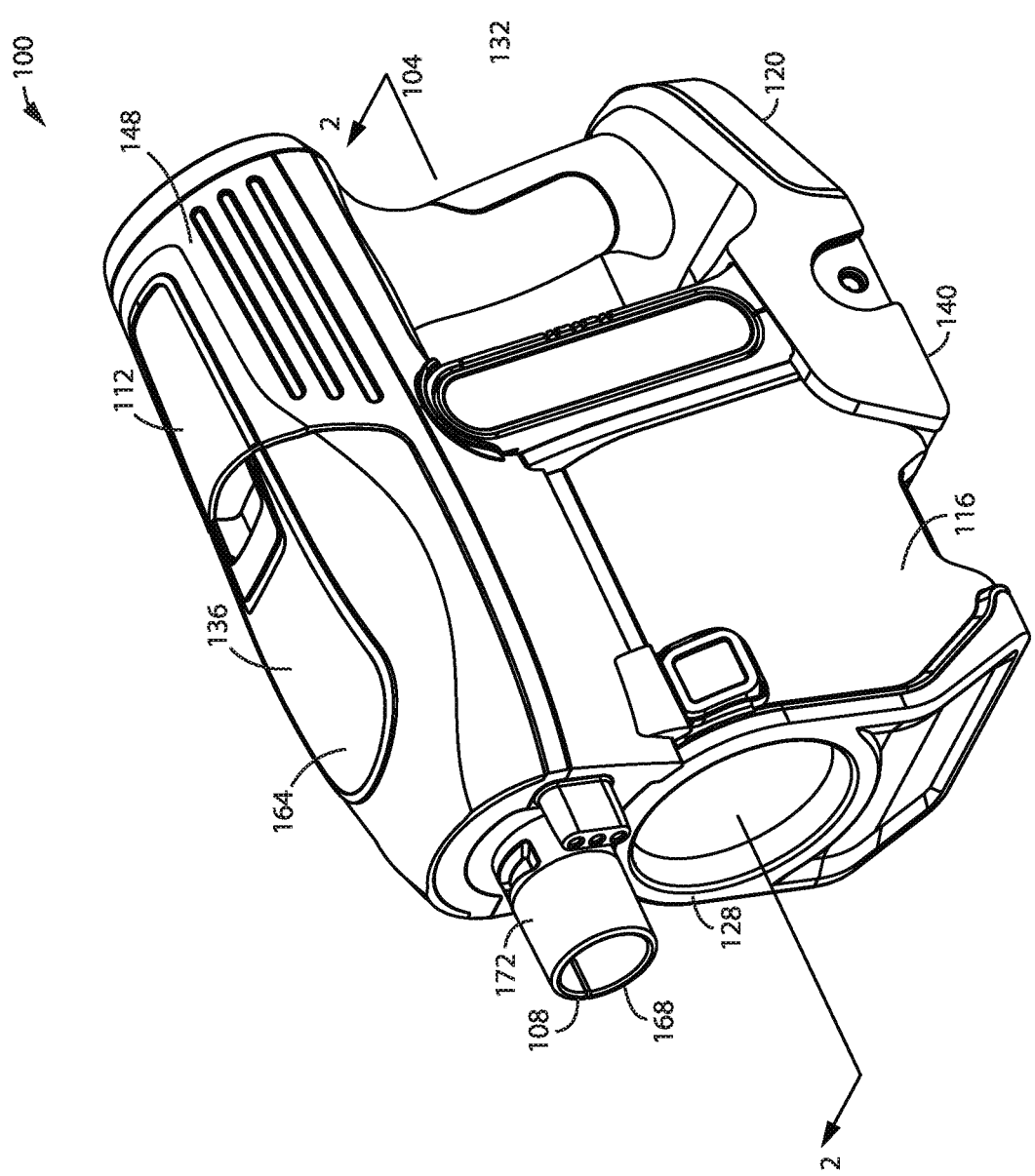
FIG. 1 is a perspective view of a surface cleaning apparatus in accordance with an embodiment.

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of a Vacuum Cleaner

Figure 2:
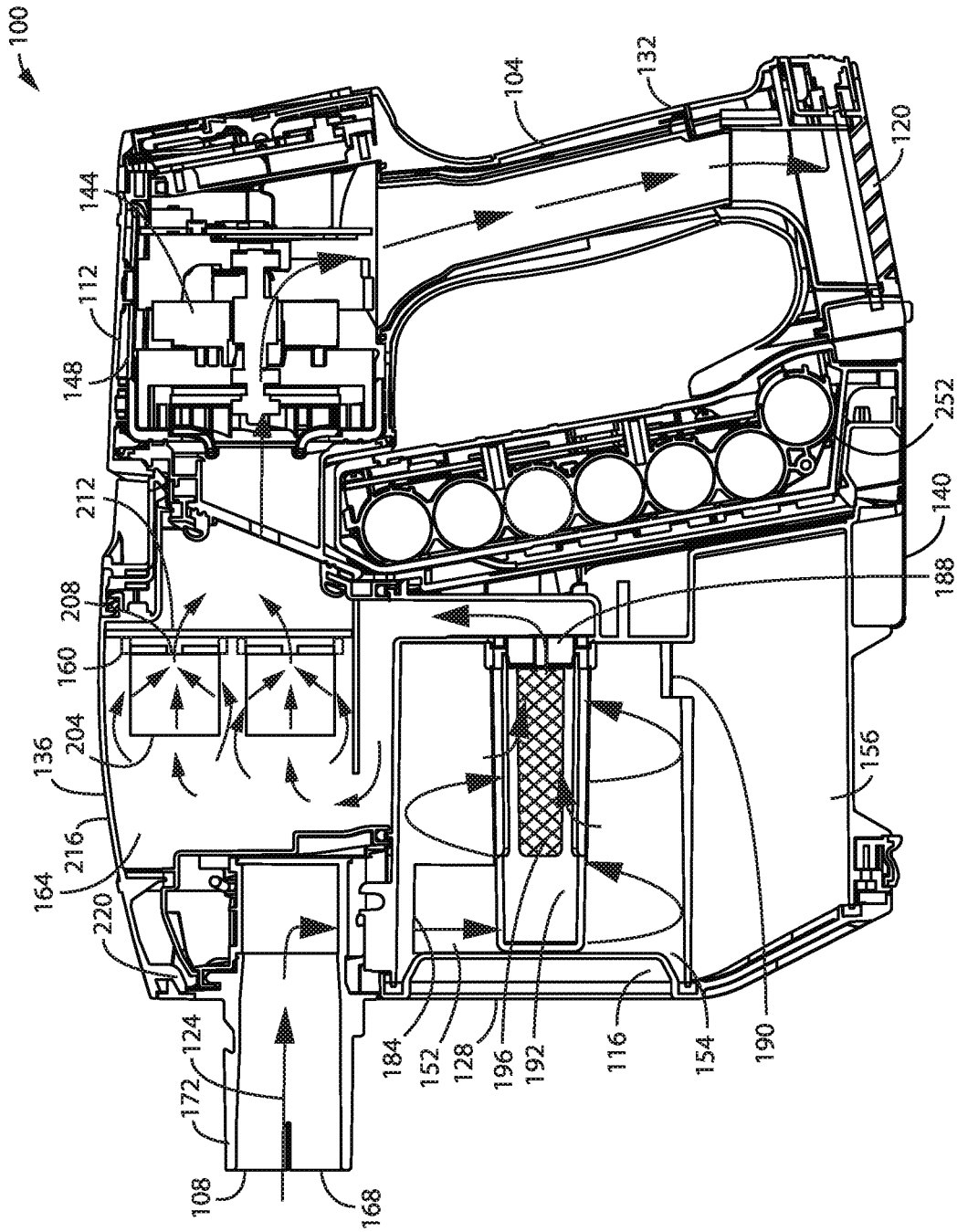
FIG. 2 is a cross-sectional view taken along line 2-2 in FIG. 1.

Referring to FIGS. 1-2, an exemplary embodiment of a surface cleaning apparatus is shown generally as 100. The following is a general discussion of apparatus 100 which provides a basis for understanding several of the features which are discussed herein. As discussed subsequently, each of the features may be used individually or in any particular combination or sub-combination in this or in other embodiments disclosed herein.

Embodiments described herein include an improved filter member 160, and a surface cleaning apparatus 100 including the same. Surface cleaning apparatus 100 may be any type of surface cleaning apparatus, including for example a hand vacuum cleaner as shown, a stick vacuum cleaner, an upright vacuum cleaner, a canister vacuum cleaner, an extractor or a wet/dry type vacuum cleaner. Optionally, the surface cleaning apparatus may use one or more cyclones and may therefore be a cyclonic surface cleaning apparatus.

In FIGS. 1-2, surface cleaning apparatus 100 is illustrated as a hand vacuum cleaner, which may also be referred to also as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, handle 104 and dirty air inlet 108 may be rigidly coupled to each other (directly or indirectly), such as being integrally formed or separately molded and then non-removably secured together such as by an adhesive or welding, so as to move as one while maintaining a constant orientation relative to each other. This is to be contrasted with canister and upright vacuum cleaners, whose weight is typically supported by a surface (e.g. a floor) during use, and when a canister vacuum cleaner is operated or when an upright vacuum cleaner is operated in a 'lift-away' configuration, a second hand is typically required to direct the dirty air inlet at the end of a flexible hose.

Still referring to FIGS. 1-2, surface cleaning apparatus 100 includes a main body or a hand vac body 112 having an air treatment member 116 (which may be permanently affixed to the main body or may be removable therefrom for emptying), a dirty air inlet 108, a clean air outlet 120, and an air flow path 124 extending between the dirty air inlet 108 and the clean air outlet 120.

Surface cleaning apparatus 100 has a front end 128, a rear end 132, an upper end (also referred to as the top) 136, and a lower end (also referred to as the bottom) 140. In the embodiment shown, dirty air inlet 108 is at an upper portion of apparatus front end 128 and clean air outlet 120 is at a rearward portion of apparatus 100 at apparatus rear end 132. It will be appreciated that dirty air inlet 108 and clean air outlet 120 may be positioned in different locations of apparatus 100.

A suction motor 144 is provided to generate vacuum suction through air flow path 124, and is positioned within a motor housing 148. Suction motor 144 may be a fan-motor assembly including an electric motor and impeller blade(s). In the illustrated embodiment, suction motor 144 is positioned in the air flow path 124 downstream of air treatment member 116. In this configuration, suction motor 144 may be referred to as a "clean air motor". Alternatively, suction motor 144 may be positioned upstream of air treatment member 116, and referred to as a "dirty air motor".

Air treatment member 116 is configured to remove particles of dirt and other debris from the air flow. In the illustrated example, air treatment member 116 includes a cyclone assembly (also referred to as a "cyclone bin assembly") having a single cyclonic cleaning stage with a single cyclone 152 and a dirt collection chamber 156 (also referred to as a "dirt collection region", "dirt collection bin", "dirt bin", or "dirt chamber"). Cyclone 152 has a cyclone chamber 154. Dirt collection chamber 156 may be external to the cyclone chamber 154 (i.e. dirt collection chamber 156 may have a discrete volume from that of cyclone chamber 154). Cyclone 152 and dirt collection chamber 156 may be of any configuration suitable for separating dirt from an air stream and collecting the separated dirt respectively and may be in communication by a dirt outlet of the cyclone chamber.

In alternate embodiments, air treatment member 116 may include a cyclone assembly having two or more cyclonic cleaning stages arranged in series with each other. Each cyclonic cleaning stage may include one or more cyclones arranged in parallel with each other and one or more dirt collection chambers, of any suitable configuration. The dirt collection chamber(s) may be external to the cyclone chambers of the cyclones. Alternatively, one or more (or all) of the dirt collection chamber(s) may be internal to one or more (or all) of the cyclone chambers. For example, the internal dirt collection chamber(s) may be configured as a dirt collection area within the cyclone chamber.

In other alternative embodiments, air treatment member 116 may not include a cyclonic cleaning stage. For example, air treatment member 116 may include a bag, a porous physical filter media (such as, for example foam or felt), one or more screen or other air treating means.

Referring to FIG. 2, hand vacuum cleaner 100 may include a pre-motor filter 160 provided in the air flow path 124 downstream of air treatment member 116 and upstream of suction motor 144. Pre-motor filter 160 may be formed from any suitable physical, porous filter media (also referred to as "porous filter material"). For example, pre-motor filter 160 may be one or more of a foam filter, felt filter, HEPA filter, or other physical filter media. In some embodiments, pre-motor filter 160 may include an electrostatic filter, or the like. As shown, pre-motor filter 160 may be located in a pre-motor filter housing 164 that is external to the air treatment member 116.

In the illustrated embodiment, dirty air inlet 108 is the inlet end 168 of an air inlet conduit 172. Optionally, inlet end 168 of air inlet conduit 172 can be used as a nozzle to directly clean a surface. Alternatively, or in addition to functioning as a nozzle, air inlet conduit 172 may be connected (e.g. directly connected) to the downstream end of any suitable accessory tool such as a rigid air flow conduit (e.g., an above floor cleaning wand), a crevice tool, a mini brush, and the like. As shown, dirty air inlet 108 may be positioned forward of air treatment member 116, although this need not be the case.

In the embodiment of FIG. 2, the air treatment member comprises a cyclone 152, the air treatment air inlet is a cyclone air inlet 184, and the air treatment member air outlet is a cyclone air outlet 188. Accordingly, in operation, after activating suction motor 144, dirty air enters apparatus 100 through dirty air inlet 108 and is directed along air inlet conduit 172 to the cyclone air inlet 184. As shown, cyclone air inlet 184 may direct the dirty air flow to enter cyclone chamber 154 in a tangential direction so as to promote cyclonic action. Dirt particles and other debris may be disentrained (i.e. separated) from the dirty air flow as the dirty air flow travels from cyclone air inlet 184 to cyclone air outlet 188. The disentrained dirt particles and debris may discharge from cyclone chamber 154 through a dirt outlet 190 into dirt collection chamber 156 external to the cyclone chamber 154, where the dirt particles and debris may be collected and stored until dirt collection chamber 156 is emptied.

Air exiting cyclone chamber 154 may pass through an outlet passage 192 located upstream of cyclone air outlet 188. Cyclone chamber outlet passage 192 may also act as a vortex finder to promote cyclonic flow within cyclone chamber 154. In some embodiments, cyclone outlet passage 192 may include a screen or shroud 196 (e.g. a fine mesh screen) in the air flow path 124 to remove large dirt particles and debris, such as hair, remaining in the exiting air flow.

From cyclone air outlet 188, the air flow may be directed into pre-motor filter housing 164 at an upstream side 204 of pre-motor filter 160. The air flow may pass through pre-motor filter 160 to porous filter media air outlet 208, and then exit through pre-motor filter chamber air outlet 212 into motor housing 148. At motor housing 148, the clean air flow may be drawn into suction motor 144 and then discharged from apparatus 100 through clean air outlet 120. Prior to exiting the clean air outlet 120, the treated air may pass through a post-motor filter, which may be one or more layers of filter media.

Filter Member

Embodiments herein relate to an improved filter member. Examples illustrated in the figures show a pre-motor filter member (also referred to more simply as a 'pre-motor filter') positioned upstream of the suction motor. It will be appreciated that embodiments of the filter member disclosed herein may be used as a post-motor filter member (also referred to more simply as a 'post-motor filter') positioned downstream of the suction motor.

When air flows through a filter member of porous filter media, most of the dirt particles removed from the air flow collect on upstream surfaces of the filter member (also referred to as 'inlet surfaces' of the filter member). An advantage of collecting dirt on exposed surfaces of the filter member is that the dirt can be more easily cleaned off of the filter member (e.g. by brushing, agitating, or washing the filter member) as compared with dirt that is trapped within the porous filter media of the filter member.

Over time, the upstream surfaces can become clogged upon collecting a threshold amount of dirt from the air flow passing through the filter media. When the upstream surfaces are clogged, the collected dirt may create substantial impedance to air flow entering the filter member through the upstream surfaces. That is, the clogged filter member may produce substantial backpressure in the air flow path. Moreover, a clogged filter member may experience greater dirt penetration into the porous filter media. Dirt that has penetrated into the inner volume of the porous filter media may be more difficult to clean. Occurrence of dirt penetration may increase because a filter member with clogged upstream surfaces has an air inlet with a much reduced effective cross-sectional area, which results in higher velocity air flow at the upstream surfaces, which drives the dirt deeper into the porous filter media. When too much dirt becomes trapped inside the porous filter media, the filter member may require replacement. Thus, dirt penetration reduces the working life of the filter member.

The disclosed filter member provides greater upstream surface area (also referred to as 'inlet surface area') as compared to prior filter designs of the same volume, all else being equal. Greater upstream surface area provides the filter member disclosed herein with more area for dirt to collect on the upstream surfaces of the filter member, and therefore the filter member can remove more dirt from an air flow before the upstream surfaces become clogged. In use, this allows the disclosed filter member to filter a greater volume of air before the filter member creates a substantial pressure drop in the air flow path or experiences substantial dirt penetration. Consequently, the disclosed filter member can be used for a longer period before cleaning or replacing the filter member. Alternately, the disclosed filter member would allow a filter having a smaller volume to be used to have the same performance as compared to prior filter designs of the same volume, all else being equal.

Figure 3:
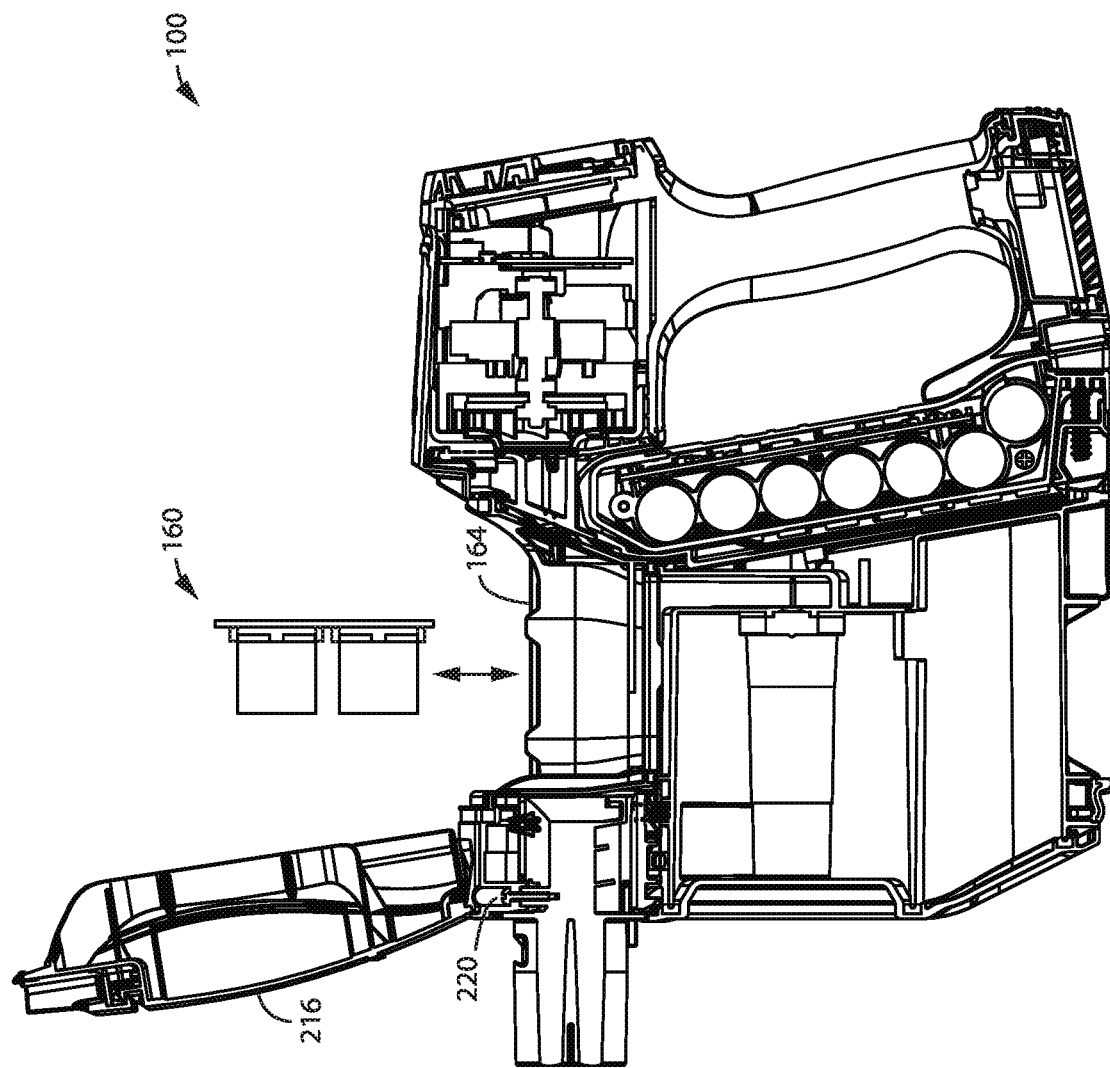
FIG. 3 is the cross-sectional view of FIG. 2, with a filter housing opened and a filter member, which comprises a plurality of individual filter elements, removed, in accordance with an embodiment.

Referring to FIGS. 2-3, surface cleaning apparatus 100 may include a filter housing 164 that holds filter member 160. Filter member 160 is preferably removable from filter housing 164 for cleaning or replacement. Alternatively, filter member 160 may be permanently connected to filter housing 164, and user accessible for cleaning in-situ. In the example shown, filter housing 164 includes an openable door 216. When filter housing door 216 is opened, filter member 160 may be user accessible to remove filter member 160 as shown for cleaning or replacement, or to clean (e.g. agitate or brush) filter member 160 in-situ. Alternately, filter housing 164 may be removed concurrently with filter member 160.

Door 216 may be openable in any manner that provides user access to filter member 160 when opened. In the illustrated example, door 216 is rotatably (e.g. pivotably) openable by a hinge 220. Alternatively or in addition, door 216 may be openable in translation (e.g. slide along a rail), or door 216 may be removable from apparatus 100.

Alternatively or in addition to providing user access to filter member 160, filter member 160 may be cleaned automatically by apparatus 100 (e.g. by a mechanical agitator). In such embodiments, filter housing 164 may optionally provide no user access to filter member 160. For example, filter housing 164 may not include an openable door 216.

Figure 5B:
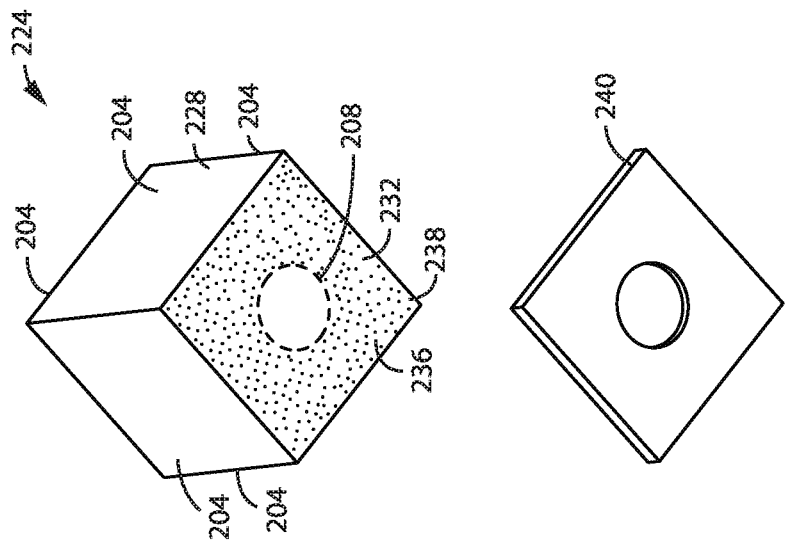
FIG. 5B is an exploded view of the filter element of FIG. 5A.
Figure 5A:
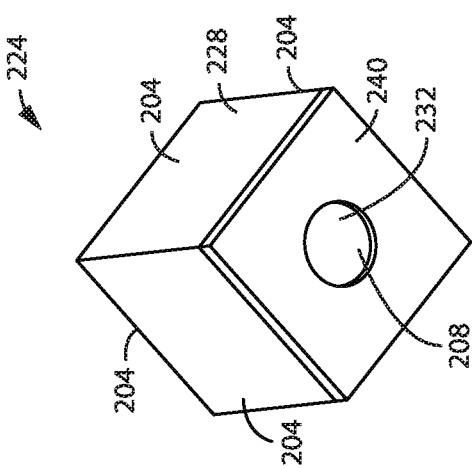
FIG. 5A is a bottom perspective view of a filter element of the filter member of FIG. 4.

Reference is now made to FIGS. 4, 5A, and 5B. Filter member 160 can include one or a plurality of individual filter elements 224 of porous filter media. In the illustrated embodiment, filter member 160 includes a plurality of filter element 224 positioned in parallel (i.e. as opposed to in series) within the air flow path 124 (FIG. 2). Each filter element 224 has an outer surface 228 that bounds the volume of porous filter media inside. The filter element outer surface 228 includes at least one upstream face 204 (also referred to as an 'upstream surface', an 'upstream side', an 'inlet face', an 'inlet surface', or an 'inlet side') that provides an inlet for air entering the filter element 224. Filter element outer surface 228 also includes at least one portion 208 that defines an air outlet for air exiting the porous filter media. In use, air enters each filter element 224 through their respective upstream face(s) 204, travels downstream within each filter element 224, and exits each filter element 224 through their respective porous filter media air outlet(s) 208.

As shown, filter member 160 has filter elements 224, which collectively have filter element upstream faces 204 with a total surface area greater than the total surface area of the filter element portions 208 that define their porous filter media air outlets. Thus, filter member 160 has a relatively large filter element upstream surface area. As explained above, this provides filter member 160 with a greater capacity to collect dirt on the filter element upstream faces 204, whereby the filter member 160 may operate longer between cleanings, and enjoy a longer working life before requiring replacement. Preferably, the total surface area of upstream faces 204 is at least twice the total surface area of the porous filter media air outlets 208. In the illustrated example, the total surface area of upstream faces 204 is greater than six times the total surface area of the porous filter media air outlets 208.

Referring to FIGS. 5A-5B, filter element 224 may have any number of upstream faces 204, and can have filter media outlet portion(s) 208 on any number of downstream faces 232. For example, filter element 224 may have a greater number of upstream faces 204 than downstream faces 232, which may promote a greater total inlet cross-sectional area than the total outlet cross-sectional area, depending on the size and configuration of the faces. In some embodiments, filter element 224 may be polyhedral. In the illustrated embodiment, filter element 224 is shown having a hexahedral (e.g. cubic) shape, with five upstream faces 204 and an outlet portion 208 provided on a single downstream face 232. In this example, the total surface area of upstream faces 204 is greater than five times the total surface area of the porous filter media air outlets 208.

Outlet portion 208 may include the entirety of filter element downstream face(s) 232 or a lesser portion thereof. In the illustrated embodiment, outlet portion 208 is less than the entire filter element downstream face 232, and is spaced apart from the immediately adjacent upstream faces 204. An advantage of this design is that it can require air that enters an upstream face 204 at a location nearest outlet portion 208 to travel at least a minimum distance (through the porous filter media) effective to filter dirt from the air flow. This may be referred to as preventing the airflow from 'effectively bypassing' the porous filter media. In this way, the dirt separation efficiency of the filter element 224 (i.e. the percentage of dirt removed from the filtered air) may be improved.

The outlet portion(s) 208 may together include any portion of filter element downstream face(s) 232. For example, outlet portion(s) 208 may have a total surface area of less than 75% of the total surface area of the filter element downstream face(s) 232. In the illustrated embodiment, outlet portion 208 is less than 50% of the surface area of the filter element downstream face 232. As shown, outlet portion 208 may be spaced apart from the upstream faces 204, which are connected to the downstream face 232. In the illustrated example, outlet portion 208 is substantially centered on upstream face 204. This may provide relatively even spacing between outlet portion 208 and the adjacent downstream faces 232.

Still referring to FIGS. 5A-5B, downstream face 232 may include portion 208 that defines the porous filter media air outlet, and a portion 236 that is made air impermeable by an air impermeable material 240 (also referred to as an 'air impermeable member 240'). As shown, air impermeable material 240 may be directly and rigidly attached to downstream face 232 to inhibit air from exiting from downstream face 232 except through outlet portion 208. In this way, air impermeable material 240 may function as an 'outlet mask' that defines (e.g. borders or circumscribes) outlet portion 208. In the illustrated example, air impermeable material 240 surrounds outlet portion 208 in order to space outlet portion 208 from all of the upstream faces 204 that border downstream face 232.

Air impermeable material 240 can be any discrete, air impermeable member that is applied to the porous filter media. In some embodiments, air impermeable material 240 has the form of a coating that is, for example sprayed, stamped, or rolled onto downstream face 232 of filter element 224. In some embodiments, air impermeable material 240 may take the form of a rigid or flexible web or substrate, such as for example a paper, plastic, metal, or silicon sheet or plate, that is rigidly and directly attached to downstream face 232 of filter element 224, such as by adhesive, a fastener, and/or fusing the air impermeable material to the filter element 224 for example. In some embodiments, air impermeable material 240 includes a combination of a coating and a web. In combination, the coating and the web may be air impermeable, even if one or both of the coating and web are air permeable individually.

As used herein, air impermeable material 240 is considered "air impermeable" where air impermeable material 240 reduces the air permeability per unit area of the surface to which it is applied by at least 75%, 80%, 85%, 90%, 95% or more than 95%.

Air impermeable material 240 may be positively connected to filter element 224 by other than, or more than, a friction fit or containment in filter housing 164 (FIG. 2). This may help ensure that the connection between air impermeable material 240 and filter element 224 is properly formed and allows air impermeable material 240 to render the portion 236 of downstream filter face 232 air impermeable.

In some embodiments, air impermeable material 240 is permanently connected to filter element 224. That is, air impermeable material 240 cannot be removed from filter element 224 without damaging one or both of air impermeable material 240 or filter element 224, and without having to reapply bonding agent 238 to restore the connection between air impermeable material 240 and filter element 224. The permanent connection allows air impermeable material 240 and filter housing 164 (FIG. 4) to be user manipulated as a unitary object that can be removed and replaced as one article, for example. The permanent connection may also prevent a loss of filter performance resulting from user error in reconnecting air impermeable material 240 to filter element 224. The permanent connection may be provided by, for example permanent adhesive, welding, coating, or melt bonding the air impermeable material 240 to filter element 224.

In other embodiments, air impermeable material 240 may be removably connected (e.g. semi-permanently connected) to filter element 224. Air impermeable material 240 and filter element 224 may remain connected until a deliberate user action is taken to separate them. This may permit air impermeable material 240 to remain attached to filter element 224 throughout the lifespan of filter element 224, and then deliberately disconnected from filter element 224 for use with a subsequent replacement filter element 224. For example, air impermeable material 240 may be connected to filter element 224 by releasable adhesive, or a fastener (e.g. screw or nail). Reusing the air impermeable material 240 may help reduce the cost and environment impact of replacement filter elements 224.

Filter member 160 can have filter elements 224 of any shape and positional arrangement. For example, filter member 160 can have filter elements 224 that are hexahedral (e.g. cubic) as seen in FIGS. 4 and 5A-5B, cylindrical, spherical, pyramidal, or another regular or irregular shape. All filter elements 224 may have the same shape or filter member 160 may have filter elements 224 of two or more shapes. Further, each filter element 224 may have one filter media air outlet 208, or several spaced apart porous filter media air outlets 208.

Figure 16:
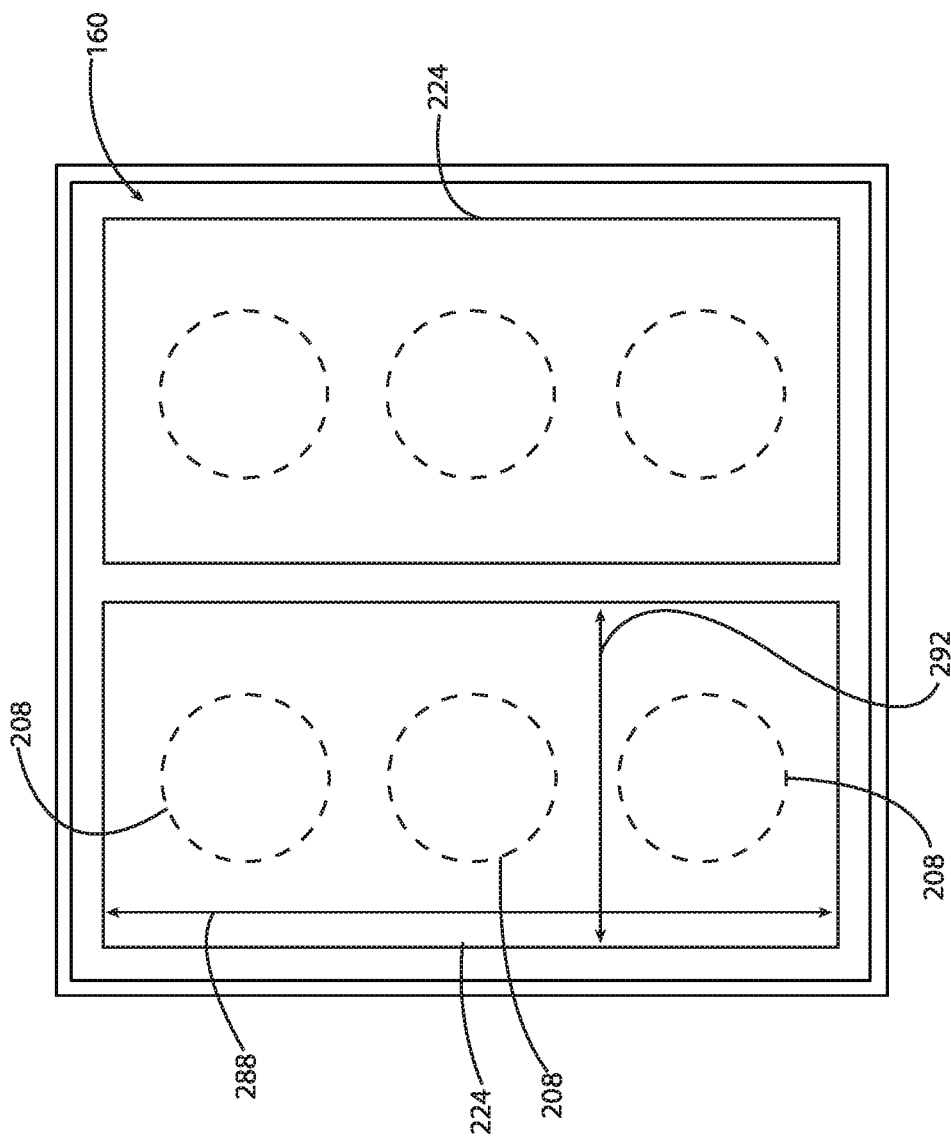
FIGS. 16-22 are top plan views of filtration assemblies in accordance with various embodiments.

FIG. 16 shows an example of filter elements 224 having a rectangular cross-section with lengths 288 that are greater than their widths 292. As shown, filter member 160 may include two, side-by-side, spaced apart filter elements 224. Each filter element 224 is shown including three porous filter media air outlets 208 distributed along the length 288 of each filter element 224.

Figure 17:
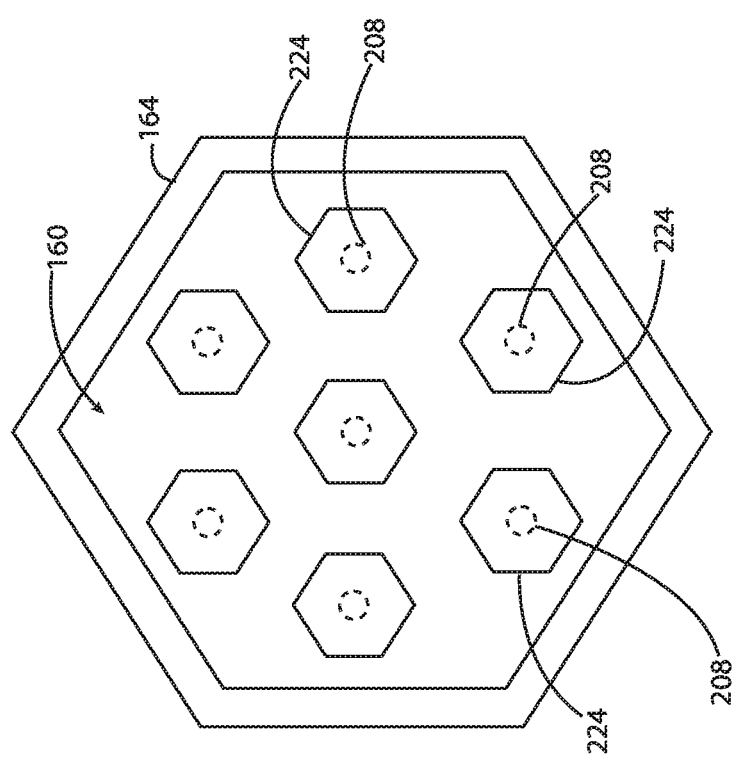

FIG. 17 shows an example of filter elements 224 each having a hexagonal cross-sectional shape. As shown, hexagonal filter elements 224 are distributed in a spaced apart manner within a hexagonal filter housing 164, and each filter element 224 is shown including one porous filter media air outlet 208.

Figure 18:
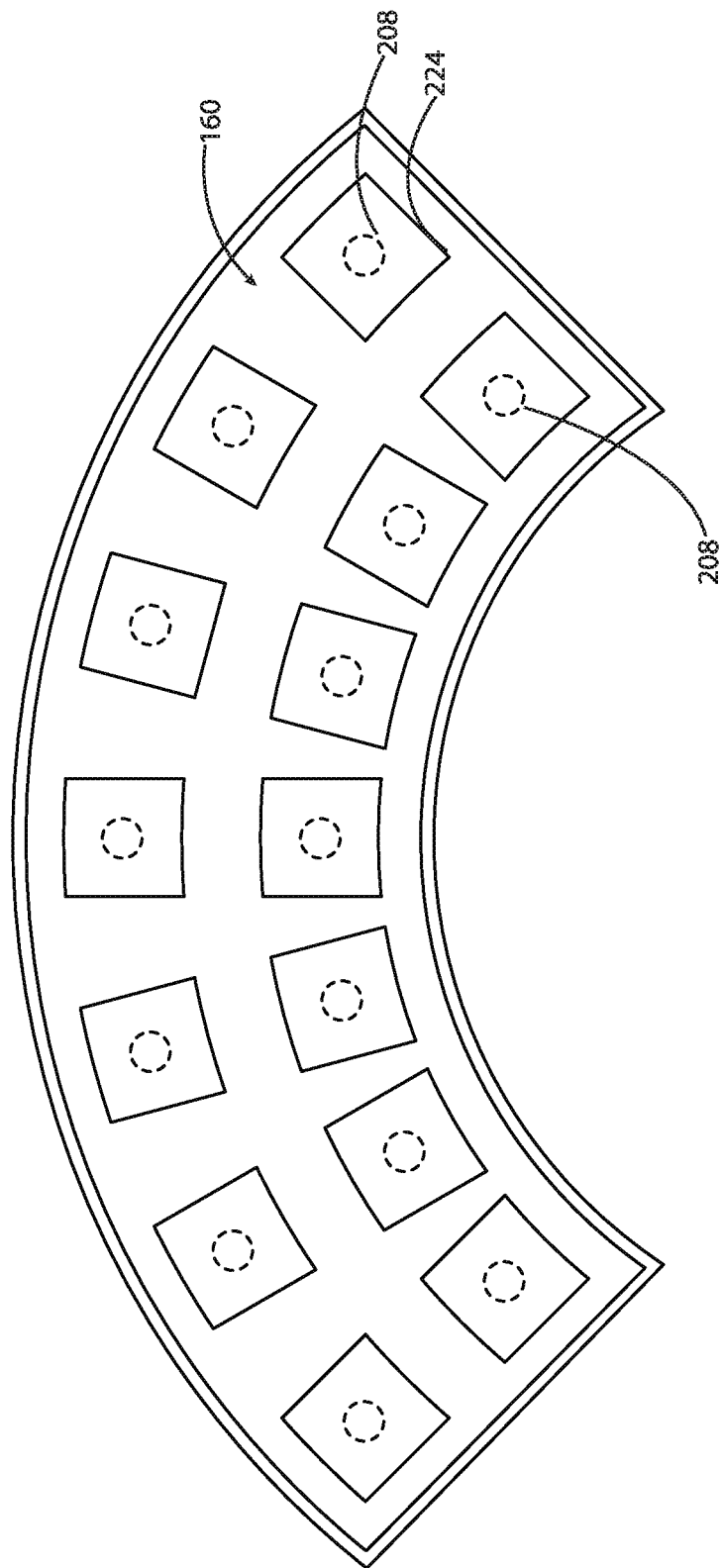

FIG. 18 shows an example of filter elements 224 each having an arcuate cross-sectional shape. As shown, arcuate filter elements 224 are distributed in a spaced apart manner within an arcuate filter housing 164, and each filter element 224 is shown including one porous filter media air outlet 208.

Figure 19:
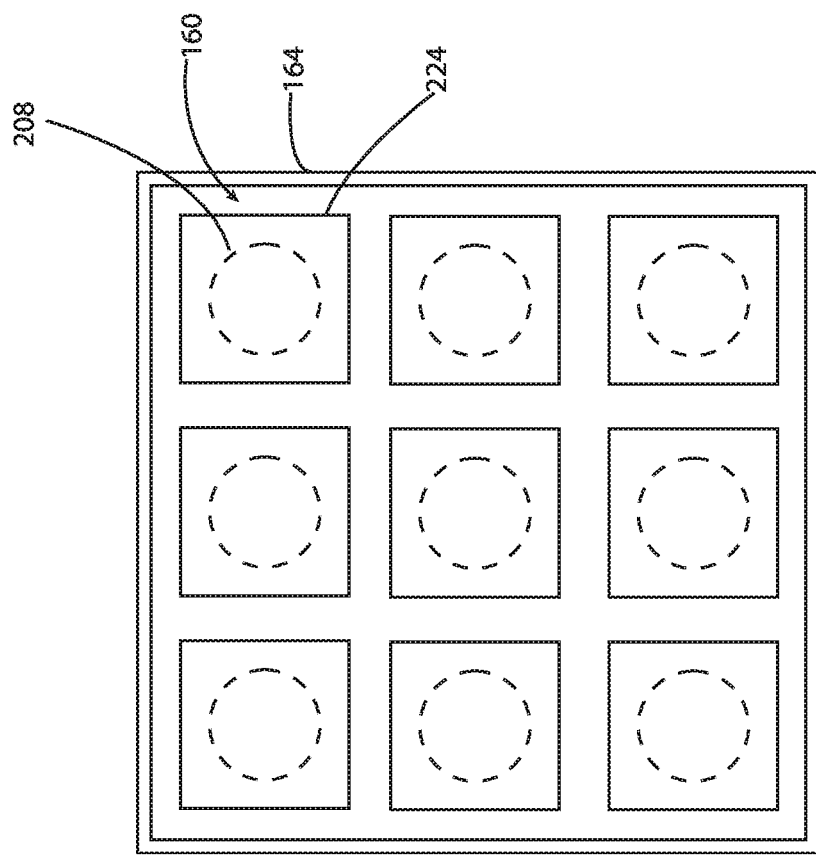
Figure 20:
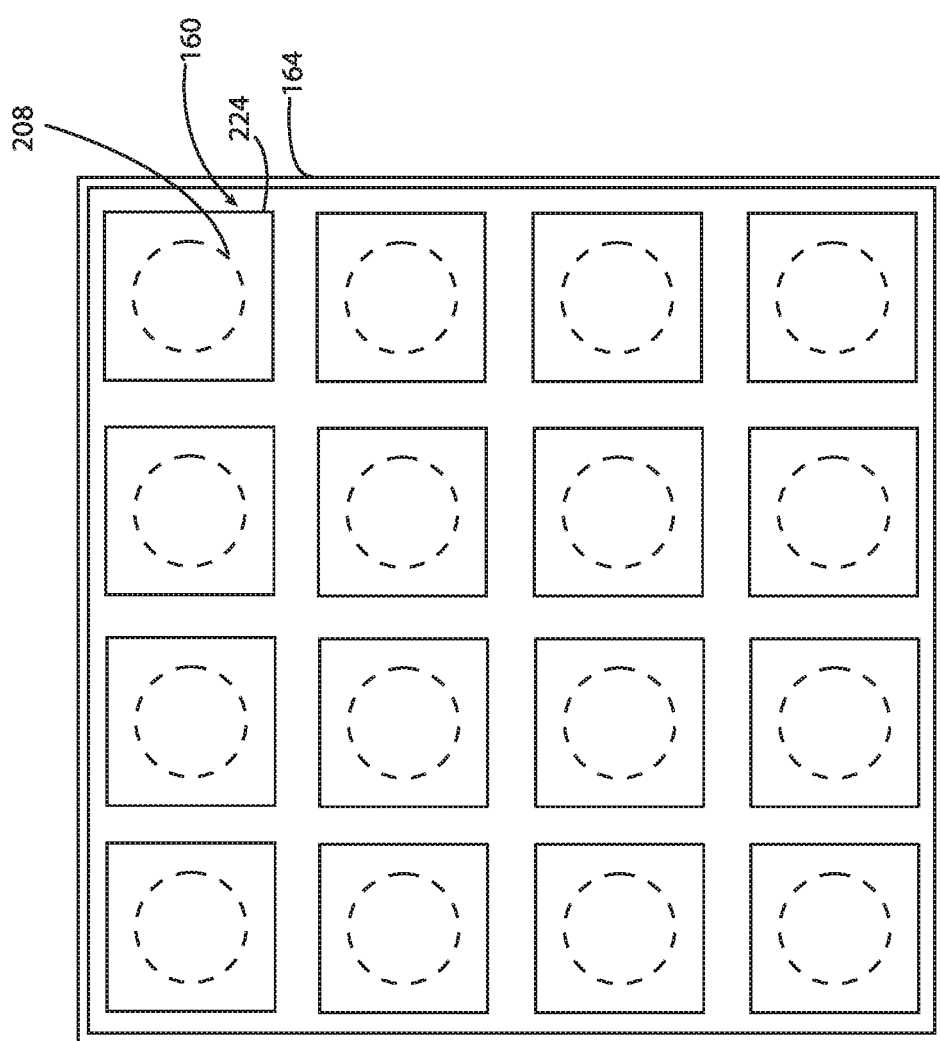
Figure 21:
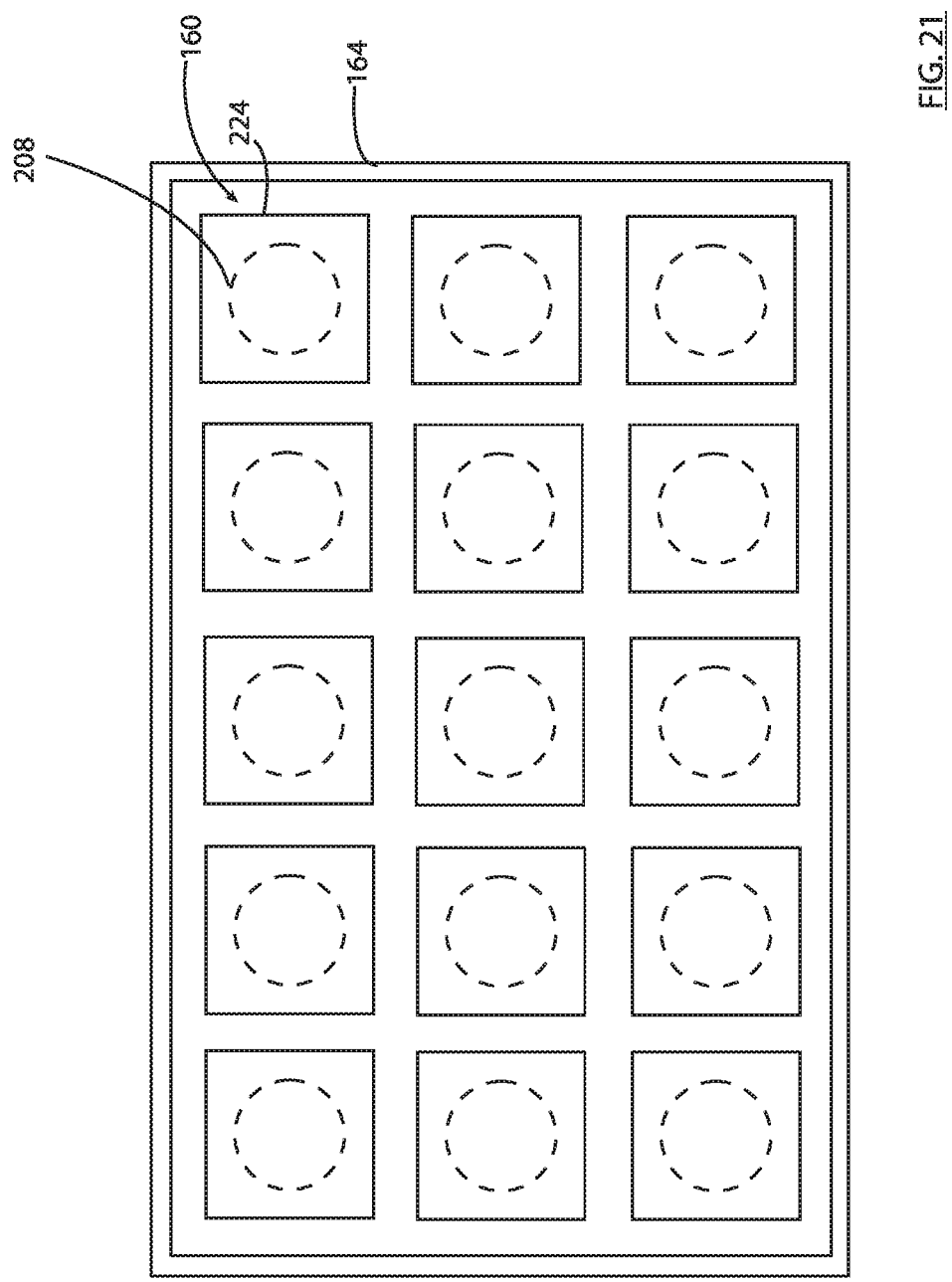

FIGS. 19-21 show examples of filter members 160 having filter elements 224, each having square cross-sectional shapes that are arranged in a 3×3, 4×4, and 5×3 grid pattern respectively.

Figure 22:
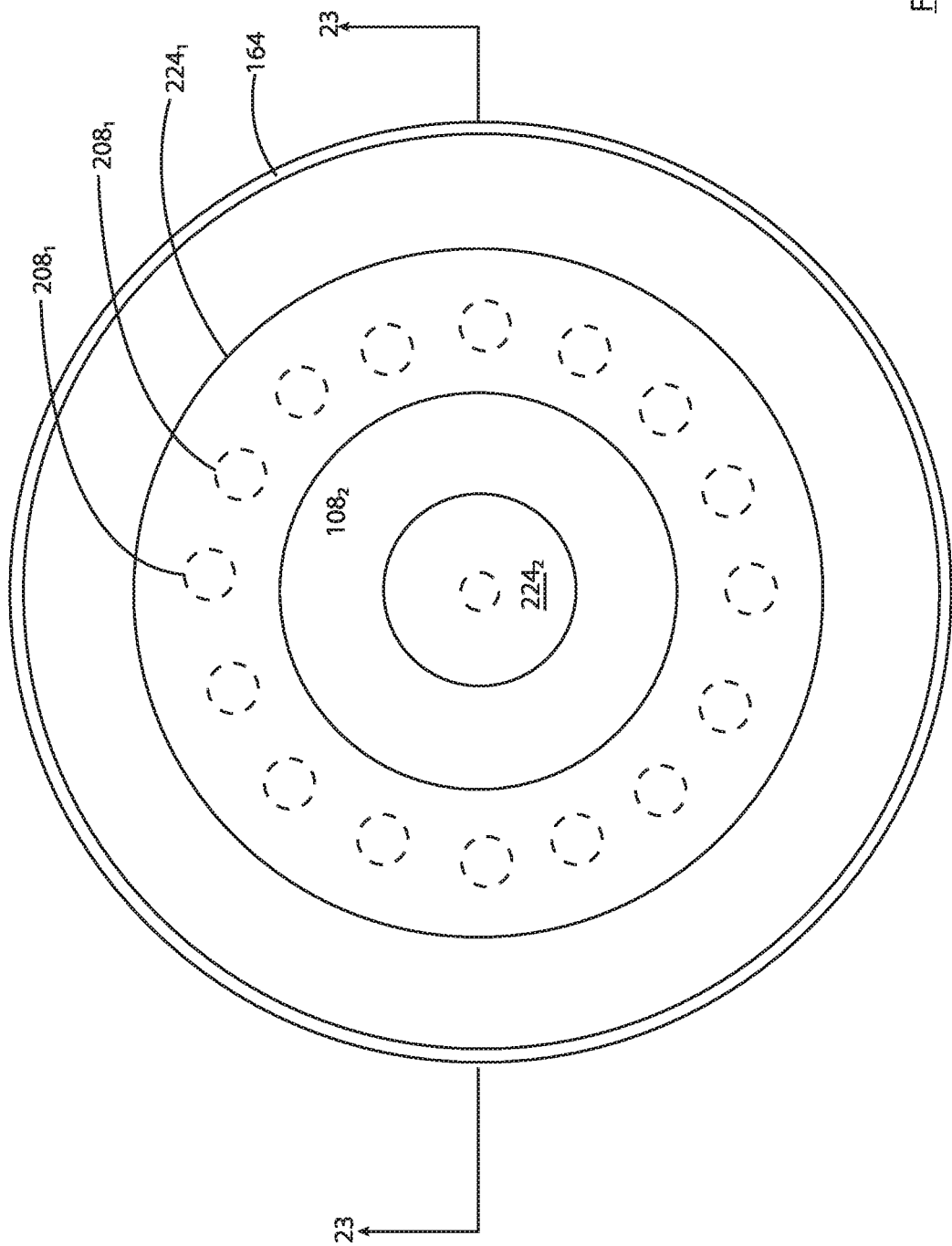
Figure 23:
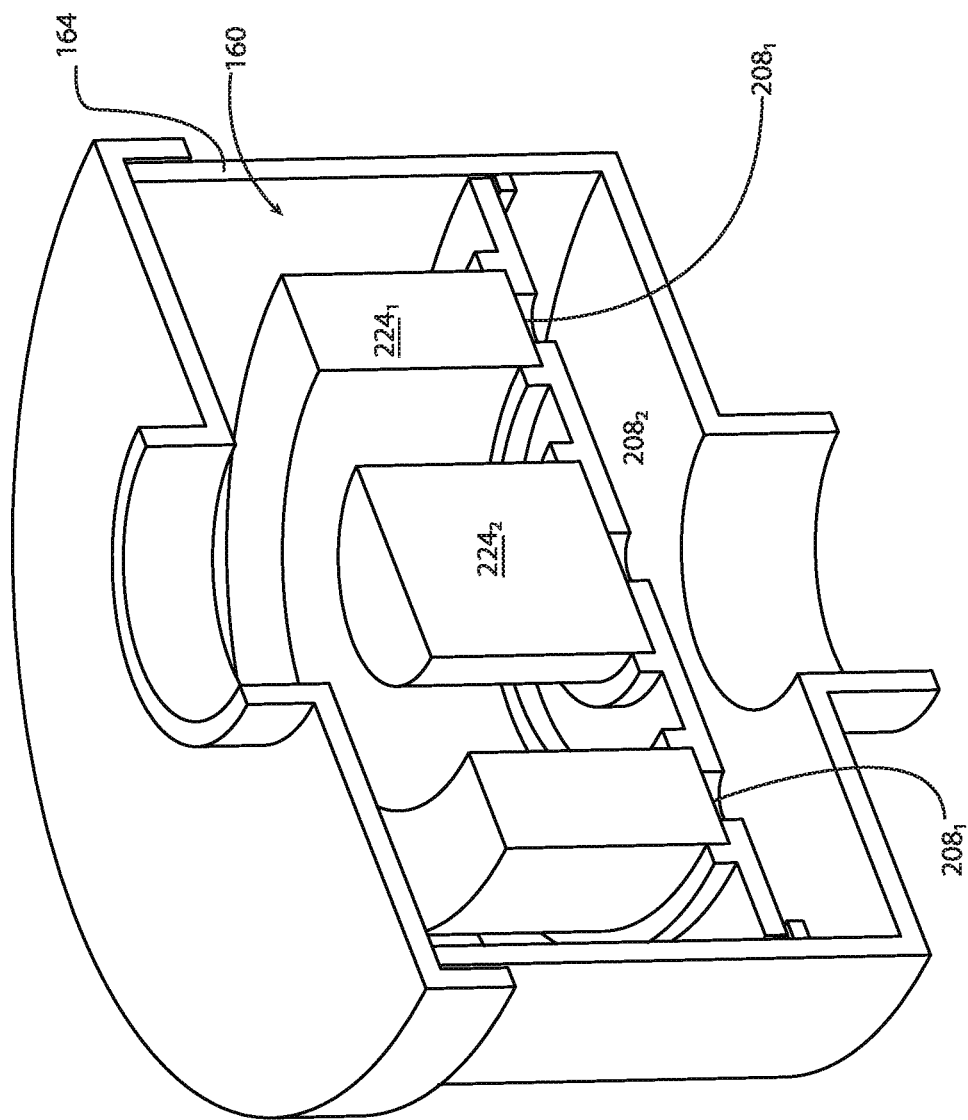
FIG. 23 is a perspective view of a cross-section taken along line 23-23 in FIG. 22.

FIGS. 22-23 show an example of a filter member 160 having filter elements $224_1$ and $224_2$ that have different cross-sectional sizes and shapes. As shown, filter element $224_1$ has an annular shape (e.g. hollow cylindrical shape), and filter element $224_2$ has a circular cross-sectional shape. Also, filter element $224_2$ is smaller than filter element $224_1$. The illustration also exemplifies that filter member 160 can have nested filter elements. In the example shown, filter element $224_2$ is nested within filter element $224_1$. Further, the illustration exemplifies that filter member 160 can have filter elements with different numbers of porous filter media air outlets. As shown, filter element $224_1$ has 16 porous filter media air outlets $208_1$ circularly distributed in spaced apart relation, and filter element $224_2$ has one filter media air outlet $208_2$.

Figure 24:
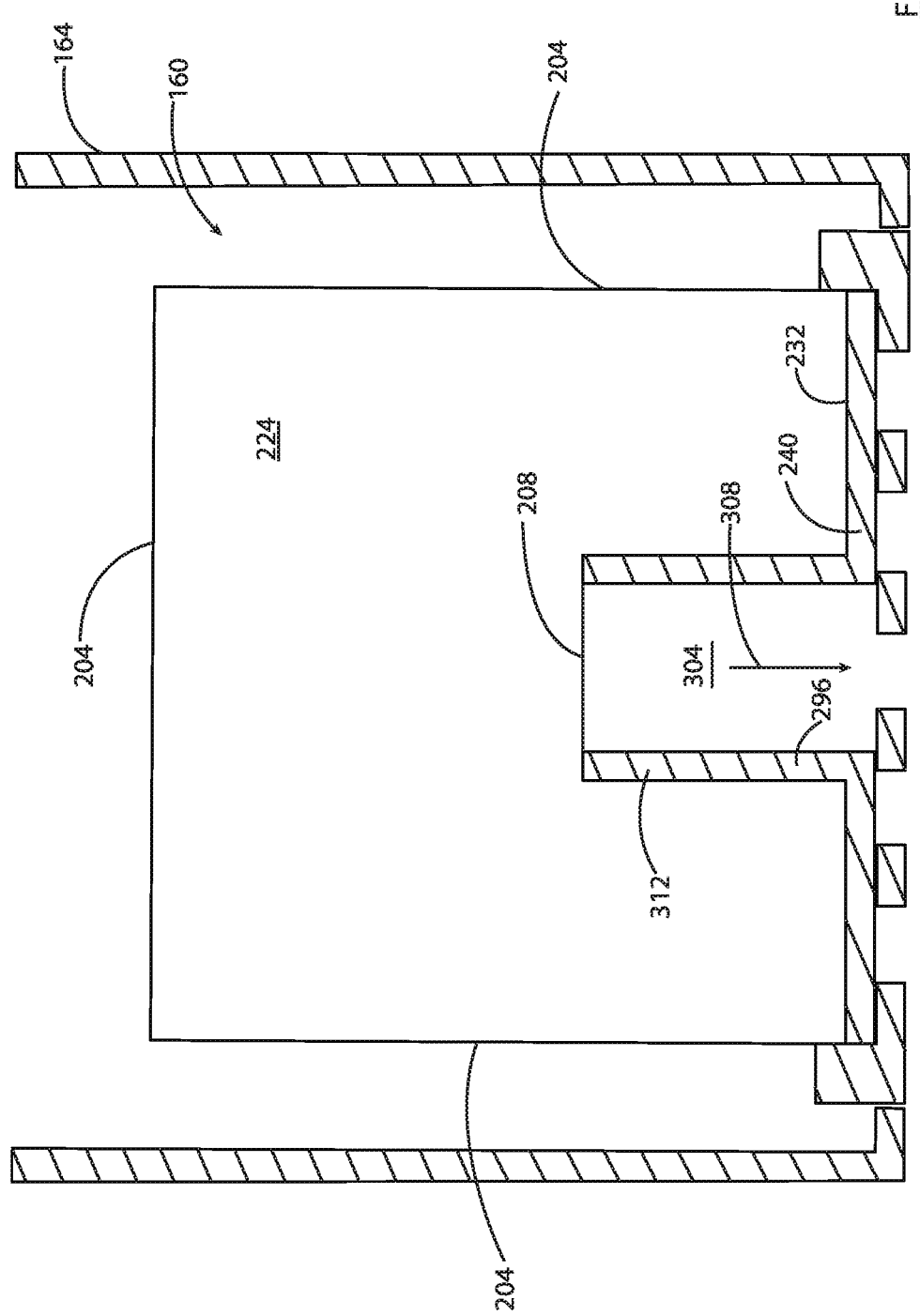
FIG. 24 is a cross-sectional view of a filtration assembly in accordance with another embodiment.
Figure 25:
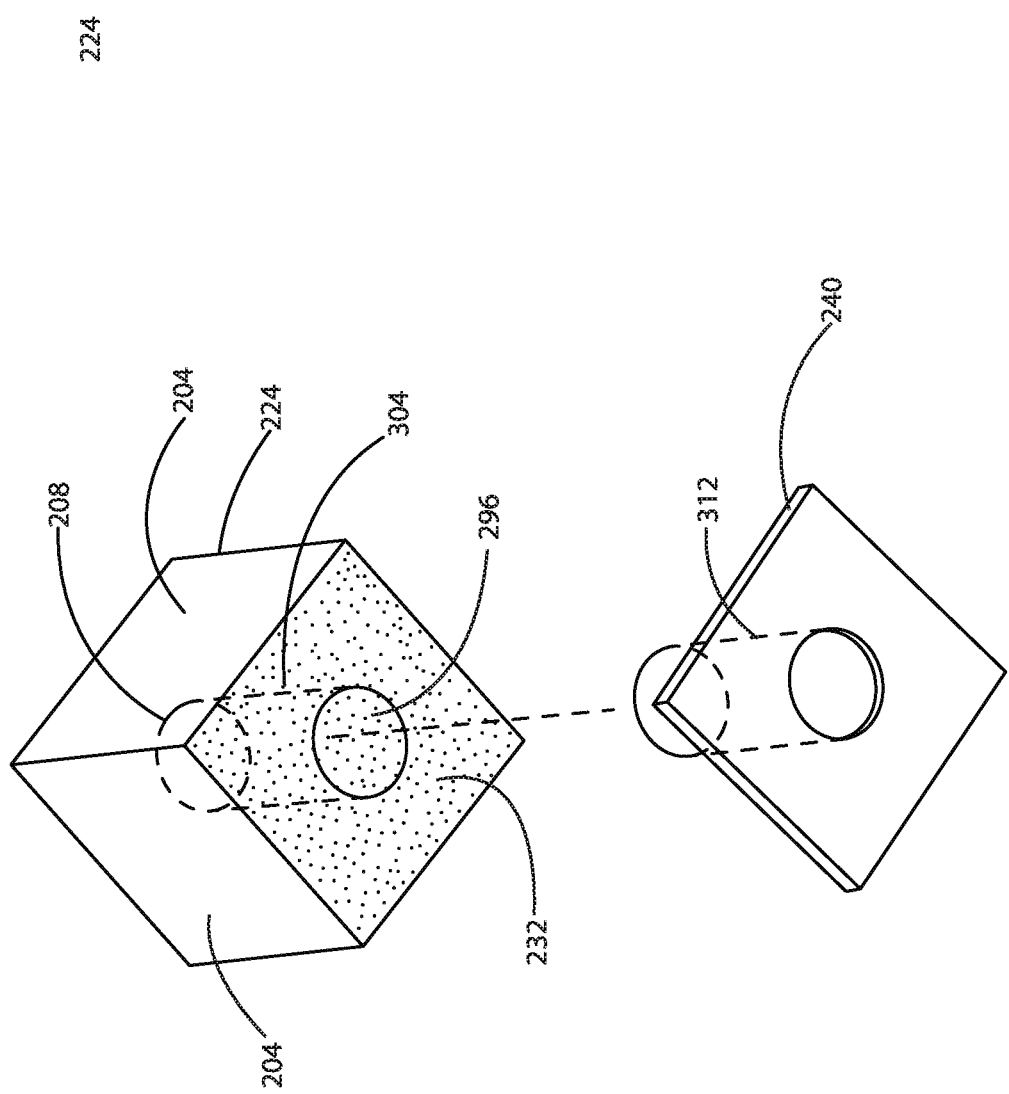
FIG. 25 is an exploded view of a filter element of the filtration assembly of FIG. 24.

Reference is now made to FIGS. 24-25. In some embodiments, outlet portion 208 may be positioned in a recess 296 of filter element 224. Recess 296 may provide an air outlet passage 304 which extends in an air flow direction 308. As shown, air outlet passage 304 may be lined with a sidewall 312. Some or all of sidewall 312 may be air impermeable. For example, air impermeable member 240 may extend from filter element downstream face 232 into air outlet passage 304. As illustrated, air impermeable member 240 may form a pipe that defines passage sidewall 312. An advantage of this design is that the porous filter media air outlet 208 is offset from filter element downstream face 232 inwards to a position that is more evenly spaced from upstream faces 204. This may provide each upstream face 204 with a more similar path length to porous filter media air outlet 208, and therefore a more similar flow resistance to porous filter media air outlet 208. In turn, this may promote a more even distribution of air flow across upstream faces 204, which may avoid premature clogging of certain upstream faces 204 that have at least initially the lowest flow resistance to porous filter media air outlet 208 and therefore admit the most air flow.

Reference is now made to FIGS. 27-33. In some embodiments, recess 296 defines an air outlet passage 304 extending from an upstream face 204. As compared with the embodiment illustrated in FIGS. 24-25, in which air outlet passage 304 extends from a downstream face 232 (some or all of which may be made air impermeable by an air impermeable member 240), upstream face 204 may provide additional upstream surface area to filter element 224. As discussed above, additional upstream surface area may provide the filter member 160 with more area for dirt to collect on the upstream faces 204 of the filter member 160, and therefore the filter member 160 can remove more dirt from an air flow before the upstream faces 204 become clogged, all else being equal. In use, this allows the filter member 160 to filter a greater volume of air before the filter member 160 creates a substantial pressure drop in the air flow path or experiences substantial dirt penetration.

In the illustrated example of FIG. 27, all exterior faces of filter element 224 may be upstream faces 204. As shown, downstream face 232 may be defined by the interior surface(s) of recess 296. Air impermeable member 240 may extend into recess 296, and overlie portion(s) 236 of downstream face 232 to make portion(s) 236 air impermeable. The remaining portion(s) 208 of downstream face 232 may define a porous filter media air outlet.

FIG. 27 may appear to illustrate air impermeable member 240 as being spaced apart from the interior surfaces of recess 296. This spacing is only shown for clarity to provide air impermeable member 240 and recess 296 with distinguishable lines in the illustration. It will be understood that air impermeable member 240 is in fact positioned as having flush contact with the interior surfaces of recess 296 as exemplified in FIG. 31.

As shown, air impermeable portion 236 may extend from an upstream face 204 inwardly. That is, portion(s) 208 that defines the porous filter media air outlet may be spaced apart from recess opening 322 at the upstream face 204. As discussed above, this may position porous filter media air outlet 208 more centrally within filter element 224, whereby each upstream face 204 may have a more similar path length to porous filter media air outlet 208, and therefore a more similar flow resistance to porous filter media air outlet 208, all else being equal.

As exemplified in FIG. 31, air impermeable member 240 includes a portion 324 within recess 296, and recess portion 324 includes an outer portion 326 extending inwardly from upstream face 204 and an inner portion 328 extending inwardly from outer portion 326. As shown, inner portion 328 may border (e.g. surround or circumscribe) the portion(s) 208 defining the porous filter media air outlet. Portions 208 may be bordered by openings 332 formed in inner portion 328, an open inner end 336 of inner portion 328, or both as shown. Outer portion 326 may not border any air outlet portion(s) 208. For example, outer portion 326 may provide contiguous coverage (free of openings) over a length 340 of recess 296 extending from recess opening 322. In some embodiments, and as shown, outer portion length 340 (measured in airflow direction 308) may be at least ¼ of recess length 344 (measured in airflow direction 308). Depending on the shape of filter element 224, such length 340 may permit outer portion 326 to effectively offset porous filter media air outlet 208 inwardly from recess opening 322 at upstream face 204. As discussed above, such an offset may provide numerous advantages.

The illustrated example shows air impermeable recess portion 324 formed as a pipe which extends to an inner end 348 of filter element recess 296. An advantage of this design is that it simplifies installing filter element 224 onto air impermeable member 240 (i.e. filter element 224 is inserted as far as possible into recess 296). In alternative embodiments, air impermeable recess portion 324 may be spaced apart from recess inner end 348. For example, outer portion may be secured in position, such as by an adhesive, so that no inner portion 328 is required (e.g., in FIG. 31, inner portion may be removed and outer portion may be secured in the position shown). In such a case, outlet portion 208 comprises a contiguous (e.g. cylindrical) section of recess 296 extending from recess inner end 348. An advantage of this design is that it may permit porous filter media air outlet 208 to have a greater surface area.

FIGS. 34-38 illustrate examples in which filter element 224 is cylindrically shaped.

FIGS. 39-45 illustrate examples in which filter element 224 has a round shape (e.g. substantially ovoid or spherical shape).

Filter Housing Having a Filter Member

Embodiments herein relate to an improved filter housing, which may hold the filter member disclosed herein.

Reference is now made to FIGS. 2, 6, and 7. Filter member 160 may be configured (e.g. sized, shaped, and arranged) within filter housing 164 to mitigate backpressure. This allows apparatus 100 to draw greater air flow with same size of suction motor 144, or to draw the same air flow with a smaller, lighter, less expensive suction motor 144, all else being equal. In some embodiments, filter member 160 may be configured to provide an air flow path within filter housing 164 having a cross-sectional area that is equal to or greater than a cross-sectional area of the air flow path 124 at one or many critical positions upstream of filter housing 164.

As shown, within filter housing 164, a filter element 224 may be positioned with their upstream faces 204 spaced apart from opposing filter housing walls 242 by an outside gap 244. Outside gap 244 may provide an unobstructed path for air to access and enter upstream faces 204, which are opposed to housing walls 242. In embodiments of filter member 160 that have more than one filter element 224, the filter upstream faces 204 may be spaced apart from opposing upstream faces 204 of adjacent filter elements 224 by an inside gap 248. Inside gap 248 may provide an unobstructed path for air to access and enter upstream faces 204, which are opposed to another upstream face 204.

Outside gaps 244 and inside gaps 248 together have a gap cross-sectional area in a plane 250 transverse to a direction of air flow through the gaps 244 and 248. The gap cross-sectional area may be equal to or greater than the cross-sectional area of the air treatment member air inlet 184 (in a plane transverse to the direction of air flow through inlet 184) and/or equal to or greater than the cross-sectional area of the air treatment member air outlet 188 (in a plane transverse to the direction of air flow through air outlet 188), or both. This may mitigate backpressure that might result from a flow restriction created by the sizing of gaps 244 and 248. As discussed above, this may permit apparatus 100 to draw greater air flow with the same size of suction motor 144, or to draw the same air flow with a smaller, lighter, less expensive suction motor 144 that consumes less power, all else being equal. Without being limited by theory, creating backpressure expends energy, and therefore reducing backpressure may conserve energy. By conserving energy, a battery operated hand vacuum 100 may run for a longer duration on the same size of battery 252, or run for the same duration on a smaller, lighter, and less expensive battery 252, all else being equal.

Reference is now made to FIG. 8, which shows a filter housing 164 holding a filter member 160, in accordance with an embodiment. Filter housing 164 may be permanently connected to or integrally formed with apparatus 100 (FIG. 1). Alternatively, filter housing 164 may be removable positionable in a corresponding cavity of apparatus 100 (FIG. 1) in the manner of a cartridge. As shown, filter housing 164 may include housing sidewalls 242 that connect an upstream wall 254 to a downstream wall 256. Upstream wall 254 may include a filter housing air inlet 260. Downstream wall 256 may include a filter housing air outlet 212. In use, air travels from filter housing air inlet 260 through filter element upstream faces 204, to porous filter media air outlet 208, and then exits filter housing 164 through filter housing air outlet 212. It will be appreciated that housing air inlet 260 and air outlet 212 do not need to be provided in opposing upstream and downstream walls 254 and 256, so long as they are situated in the air flow path upstream and downstream of filter member 160 respectively. For example, filter housing 164 may be configured so that one or both of housing air inlet 260 and air outlet 212 are provided in a housing sidewall 242.

Optionally, the cross-sectional area of housing air inlet 260 in a direction transverse to the direction of air flow therethrough is equal to or substantially equal to the cross-sectional area of housing air outlet 212 in a direction transverse to the direction of air flow therethrough and/or equal to or substantially equal to the cross-sectional area of outside gap 244 and inside gap 248 in a direction transverse to the direction of air flow therethrough. In other embodiments, the cross-sectional area of outside gap 244 and inside gap 248 in a direction transverse to the direction of air flow therethrough may be 100%, 200%, 300%, 400%, 500% or more of the cross-sectional area of housing air inlet 260 in a direction transverse to the direction of air flow therethrough and/or the cross-sectional area of housing air outlet 212 in a direction transverse to the direction of air flow therethrough. An advantage of this design is that, as the filter elements accumulate dirt filtered from the air stream, an increase in back pressure produced by the air flow through the filter housing will tend to be limited and may not occur.

Turning to FIG. 9, in some embodiments a filter element 224 may include an air impermeable material 240 that extends over a portion 264 of one or more upstream faces 204 that border downstream face 232. In the illustrated example, air impermeable material 240 includes side portions 268 that extend away from downstream face 232 over a portion 264 of every upstream face 204 that borders downstream face 232. As shown, side portions 268 sit flush against upstream face portions 264 whereby upstream face portions 264 are rendered air impermeable. This may help further mitigate air from effectively bypassing the porous filter media, by inhibiting air from entering upstream face 204 at locations which most closely border porous filter media air outlet 208. As noted above, mitigating bypass may improve the dirt separation efficiency of filter element 224 by forcing the air flow to travel at least a minimum distance through the porous filter media.

Still referring to FIG. 9, filter member 160 may be positioned within filter housing 164 with filter element(s) 224 positioned spaced apart from filter housing upstream wall 254. This may define an upstream header 272 that allows air to freely diffuse across the filter element upstream faces 204.

Alternatively or in addition, filter member 160 may be positioned within filter housing 164 with filter element(s) 224 spaced apart from filter housing downstream wall 256 to define a downstream header 276. Downstream header 276 may permit air exiting filter element(s) 224 to consolidate (i.e. rejoin, merge) and exit as a singular air flow. Filter element(s) 224 may be supported in spaced apart relation from filter housing downstream wall 256 in any manner. In the illustrated example, filter housing 164 includes sidewall supports 280 that hold filter elements 224 spaced apart from filter housing downstream wall 256. As shown, filter elements 224 may rest upon sidewall supports 280 with air impermeable material 240 in contact with the sidewall supports 280. Sidewall supports 282 may be integrally formed or permanently connected to air impermeable material 240 as shown, or filter housing downstream wall 256, or neither.

FIG. 10 shows another example in which spacers 280 hold filter elements 224 spaced apart from filter housing downstream wall 256. As shown, spacers 282 may extend from air impermeable material 240 away from filter element downstream face 232. Spacers 282 may be integrally formed or permanently connected to air impermeable material 240 as shown, or filter housing downstream wall 256, or neither.

Referring to FIGS. 5A-B, each filter element 224 may include a discrete air impermeable member 240. An advantage of this design is that it may permit each filter element 224 to be removed for cleaning or replacement on an individual basis as required. Alternatively, two or more (or all) of filter elements 224 may share a common air impermeable member 240. FIG. 8 shows an example in which all of filter elements 224 share a common air impermeable member 240, which extends over the air impermeable portion 236 of each filter element downstream face 232 (see also FIG. 11). An advantage of this design is that it allows air impermeable member 240 to connect the plurality of filter elements 224 in a fixed relative positional arrangement that provides the intended outside and inside gaps 244 and 248 (FIG. 6). This may mitigate a loss of separation efficiency or an increase in backpressure as a result of user error in positionally arranging filter elements 224 with the requisite spacing.

Referring to FIG. 11, filter housing 164 may be openable to provide access to filter member 160 inside. As shown, a wall of filter housing 164 (e.g. upstream wall 254 as shown, a sidewall 242, and/or downstream wall 256) may be movable (e.g. rotatably, slideably, or removably) from a closed position (FIG. 8) to an open position (FIG. 11). In the open position, user access to inspect, clean, and/or remove filter member 160 may be provided.

In alternative embodiments, filter housing 164 may be permanently closed. For example, filter housing 164 may form a disposable filter cartridge that is to be removed and replaced when needed. This may avoid user exposure to the dirt collect by the filter member 160 that is inside filter housing 164.

Figure 12:
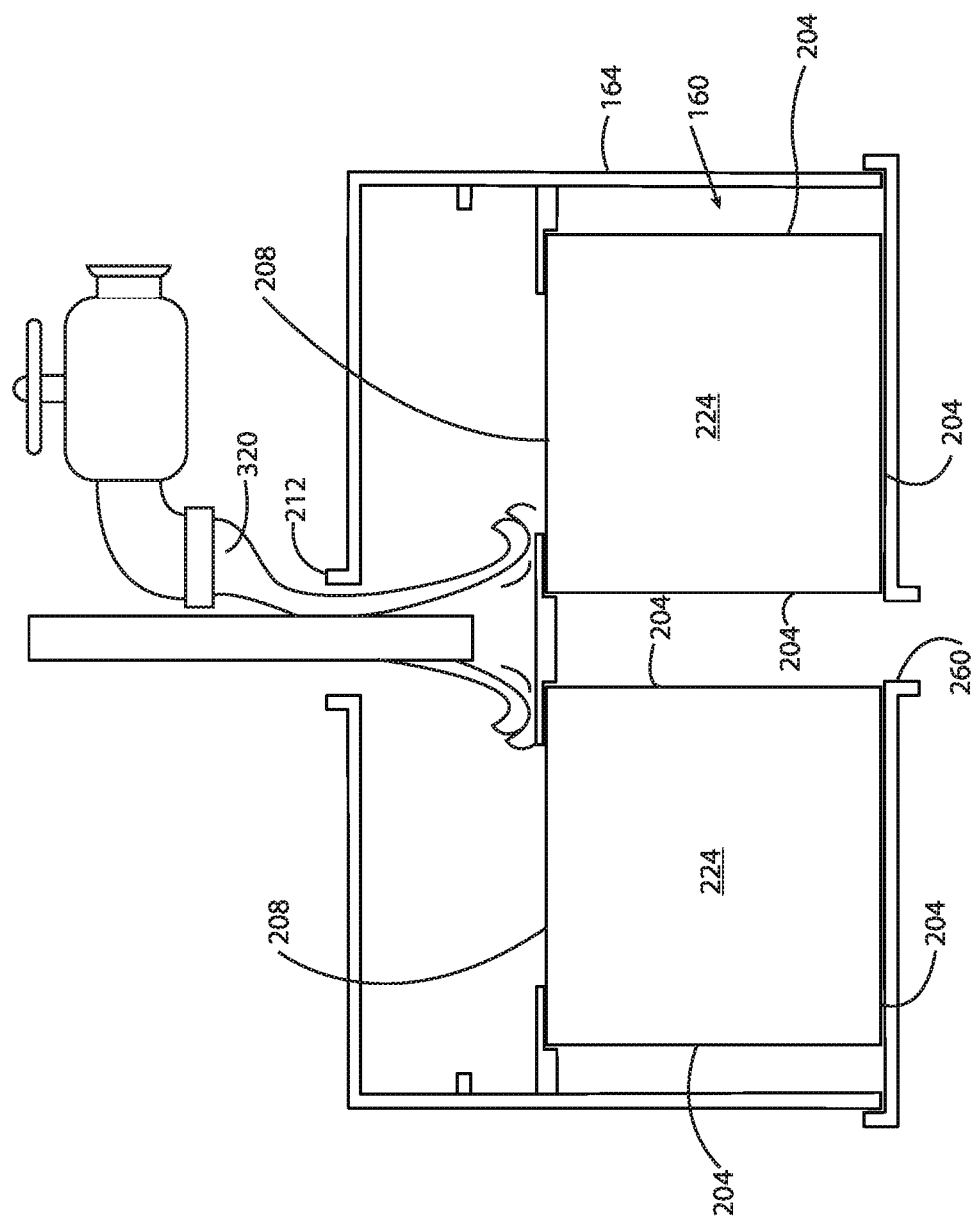
FIG. 12 is a cross-sectional view of the filtration assembly of FIG. 8 and a plunger, with the filtration assembly inverted.
Figure 13:
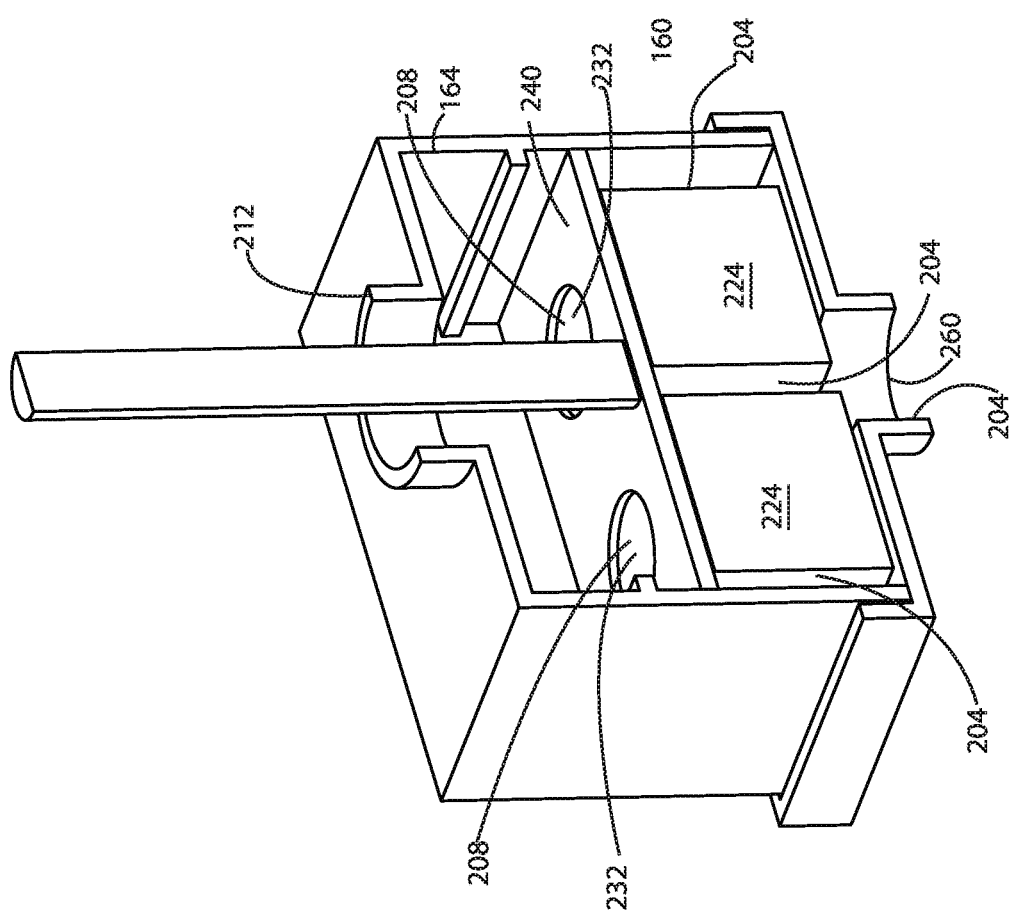
FIG. 13 is a cross-sectional perspective view of the filtration assembly and plunger of FIG. 12.
Figure 14:
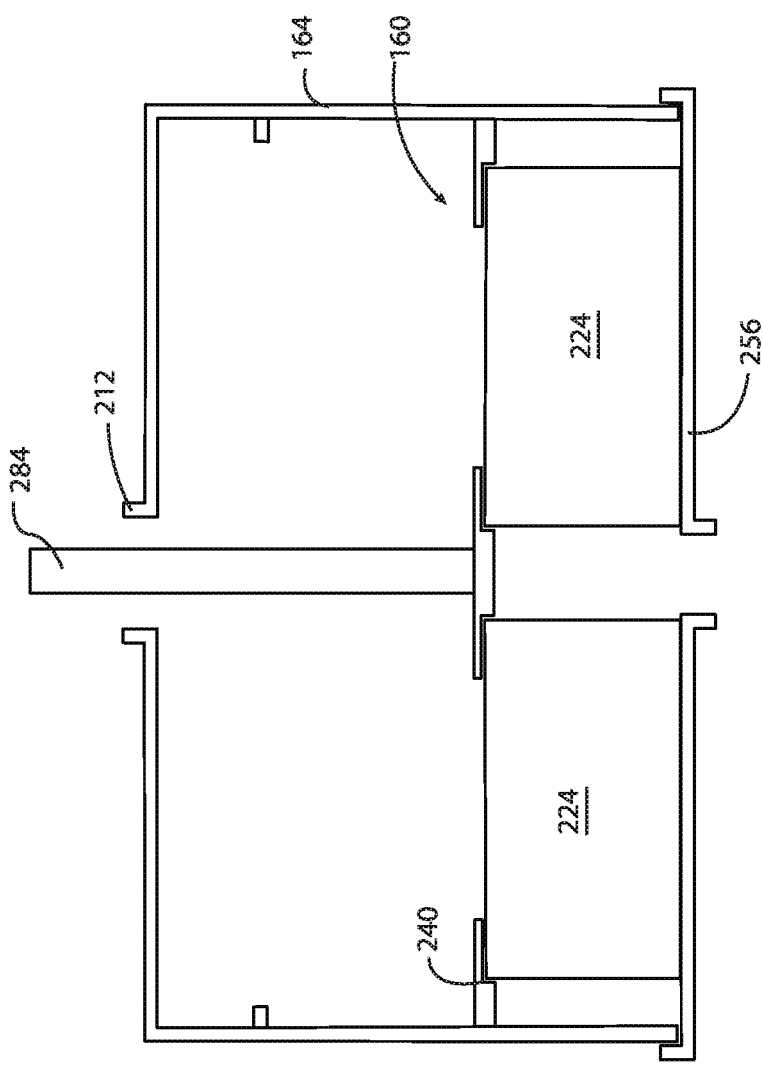
FIG. 14 is the cross-sectional perspective view of FIG. 13 showing a filter member compressed by the plunger.

Alternatively or in addition to being disposable, filter member 160 may be cleaned without opening filter housing 164. FIGS. 12-14 illustrate an exemplary method of cleaning a filter member 160 within filter housing 164. Beginning with FIGS. 12-13, filter housing 164 may be oriented with filter housing air outlet 212 face-up. A cleaning fluid 320 (e.g. water) may be poured into filter housing air outlet 212. The cleaning fluid will flow through filter elements 224 in reverse from filter element outlets 208 to upstream faces 204. The cleaning fluid may entrain dirt that is within the porous filter media, and on upstream faces 204, and carry the dirt out of filter housing 164 through filter housing air inlet 260.

Turning to FIG. 14, a plunger (e.g. a rod) 284 may be inserted through filter housing air outlet 212 and used to push filter elements 224 so that filter elements 224 become compressed against filter housing downstream wall 256. This may be done to agitate the cleaning fluid within the filter elements 224 (e.g. to dislodge additional dirt), and/or to squeeze out cleaning fluid from the filter elements 224 (e.g. to expedite drying). In the illustrated example, filter elements 224 are connected by a common air impermeable member 240, and the plunger 284 presses on the air impermeable member 240 to compress filter elements 224 as a group. Alternatively, filter elements 224 may have individual air impermeable members 240, and may be compressed individually. Alternately, a rigid member may be provided inside the filter housing and moved by a plunger to compress the filter elements.

Figure 15:
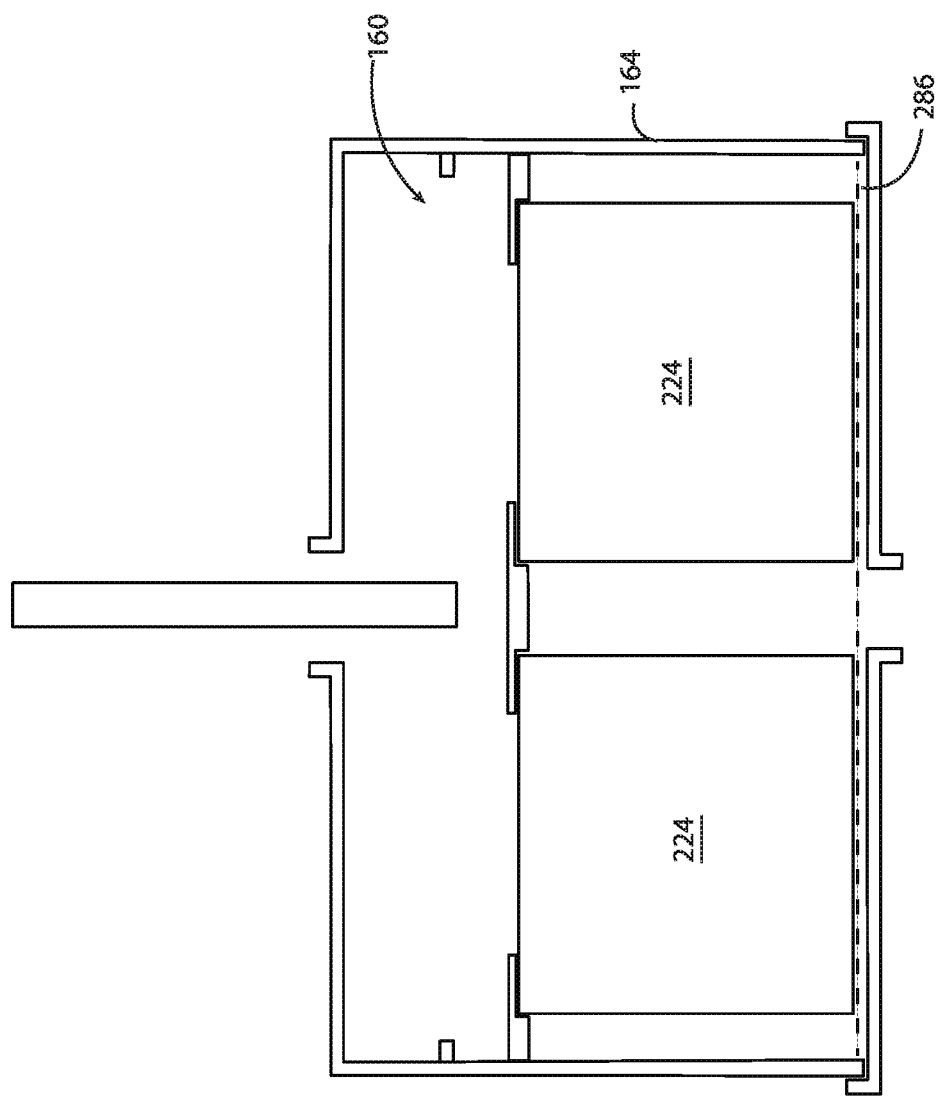
FIG. 15 is a cross-sectional view of a filtration assembly having a screen, and a plunger, with the filtration assembly inverted, in accordance with another embodiment.

As shown in FIG. 15, a screen 286 may be provided for filter elements 224 to be compressed against. As compared with a liquid impermeable wall, screen 286 may permit cleaning fluid to expel from filter element 224 through the faces in contact with screen 286. In turn, screen 286 may permit the cleaning fluid to better clean the end faces of filter elements 224.

It will be appreciated that, in alternate embodiments, a cleaning fluid may be introduced through the air inlet port and a plunger may be inserted through the air inlet port.

Distributed Filter Elements

Figure 26:
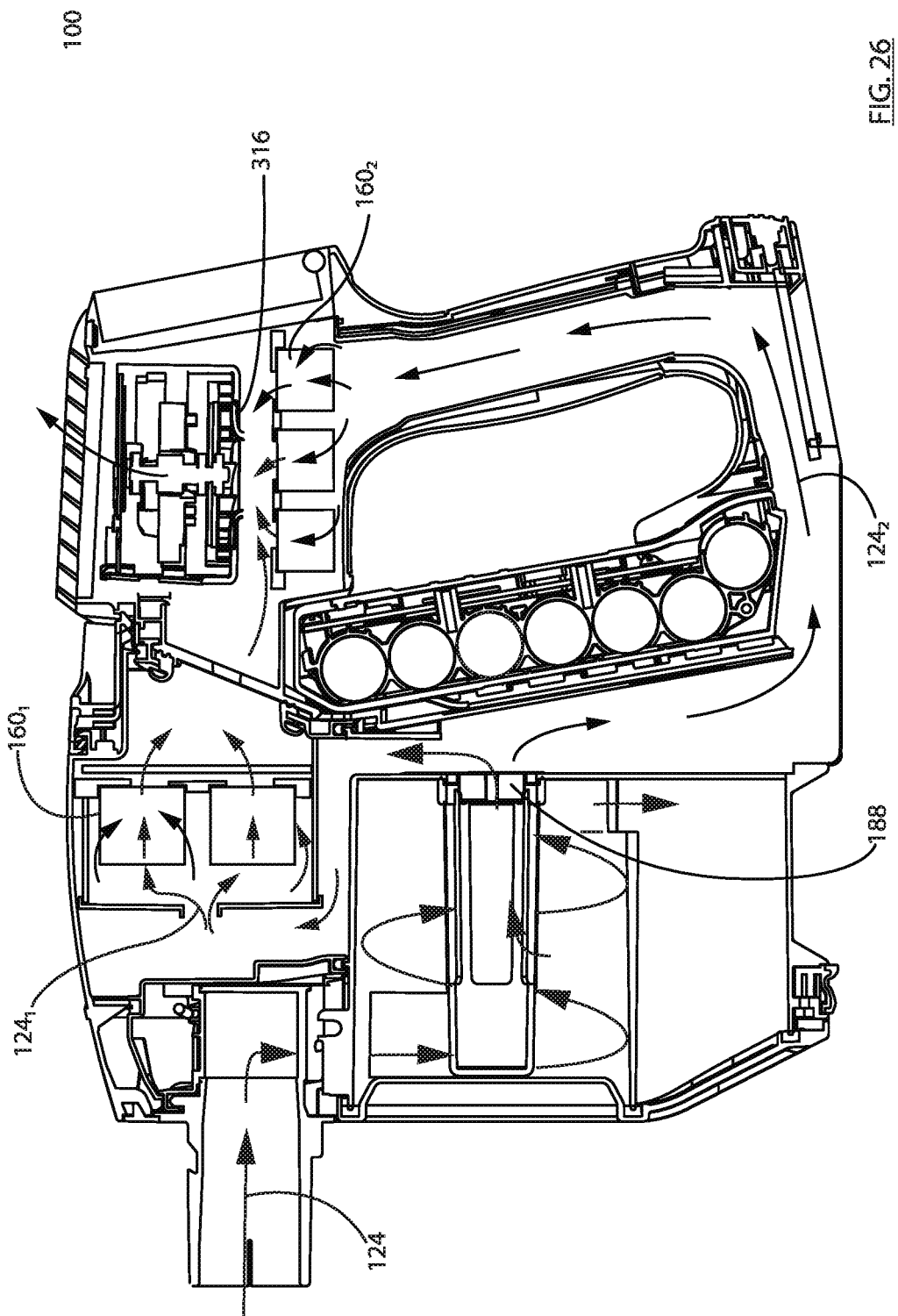
FIG. 26 is a cross-sectional view of a surface cleaning apparatus in accordance with another embodiment.
Figure 30:
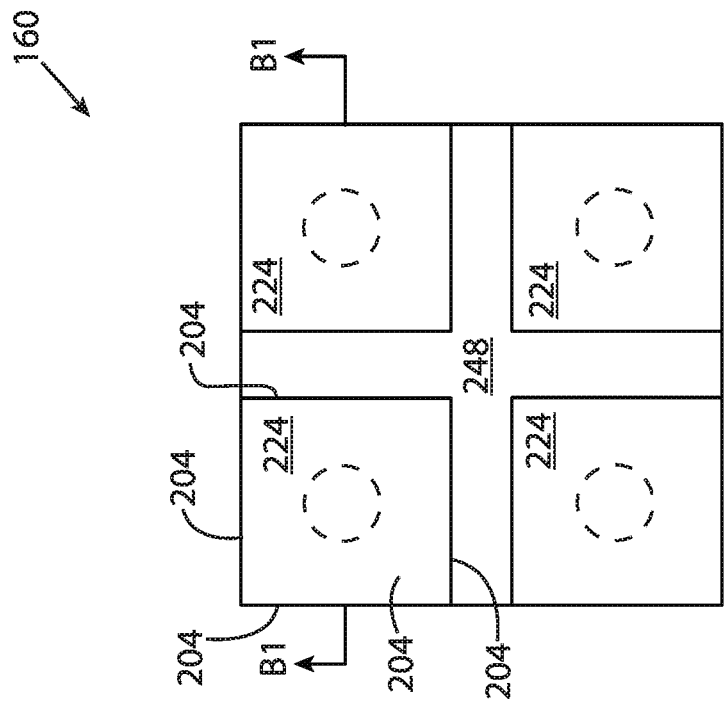
FIG. 30 is a top plan view of the filter member of FIG. 29.
Figure 29:
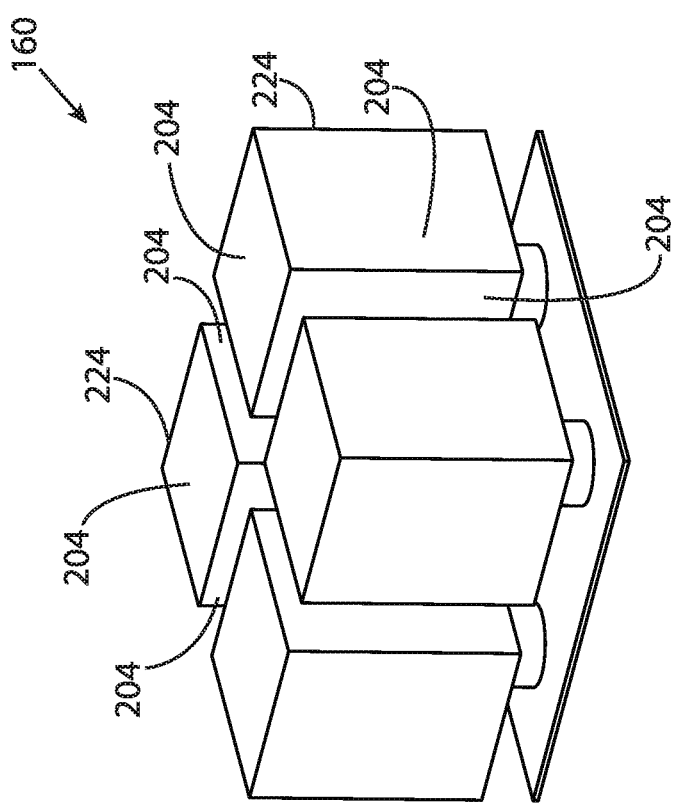
FIG. 29 is a perspective view of a filter member in accordance with another embodiment.
Figure 33:
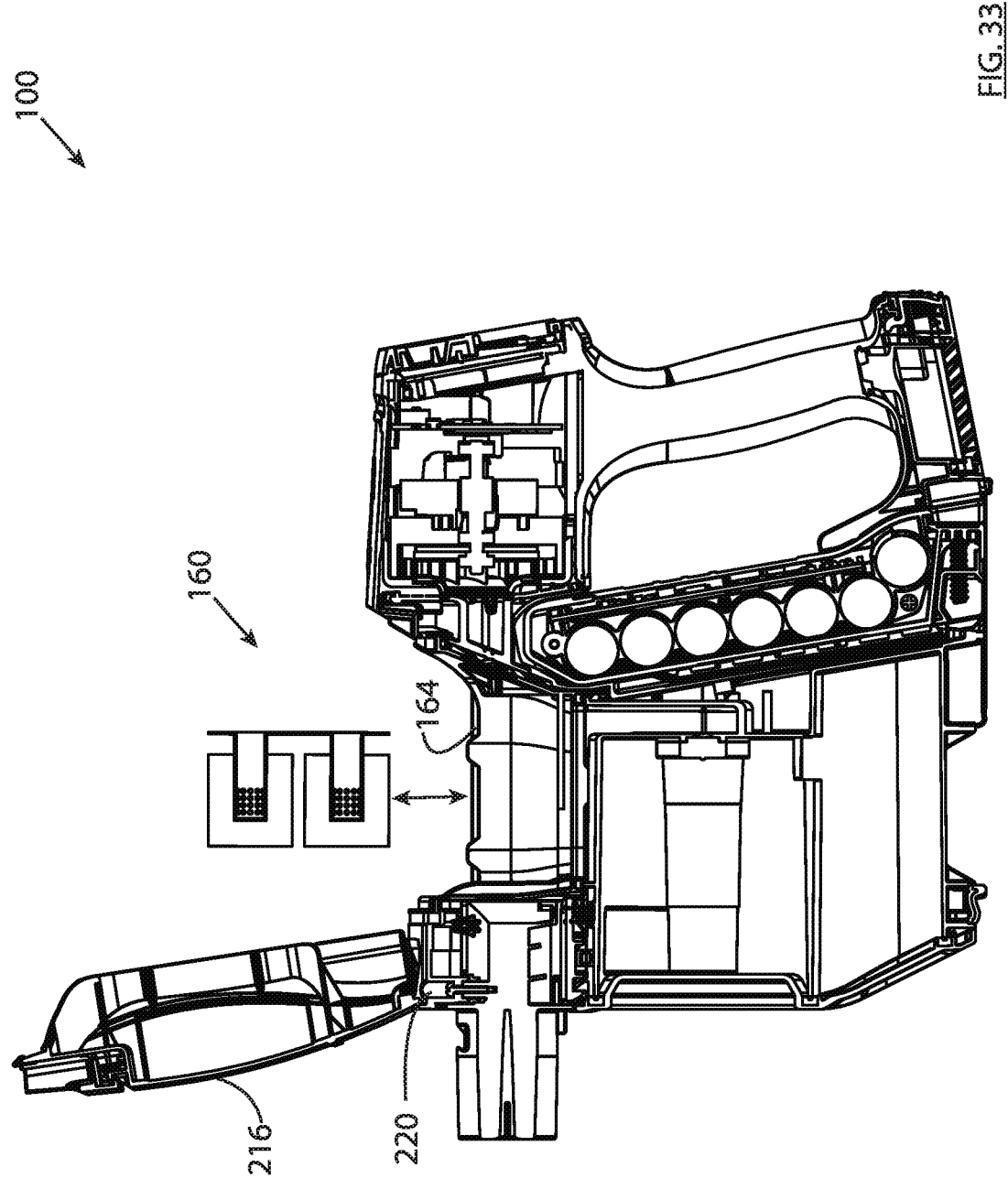
FIG. 33 is a cross-sectional view of the surface cleaning apparatus of FIG. 32, with a filter housing opened and the filter member removed, in accordance with an embodiment.
Figure 35:
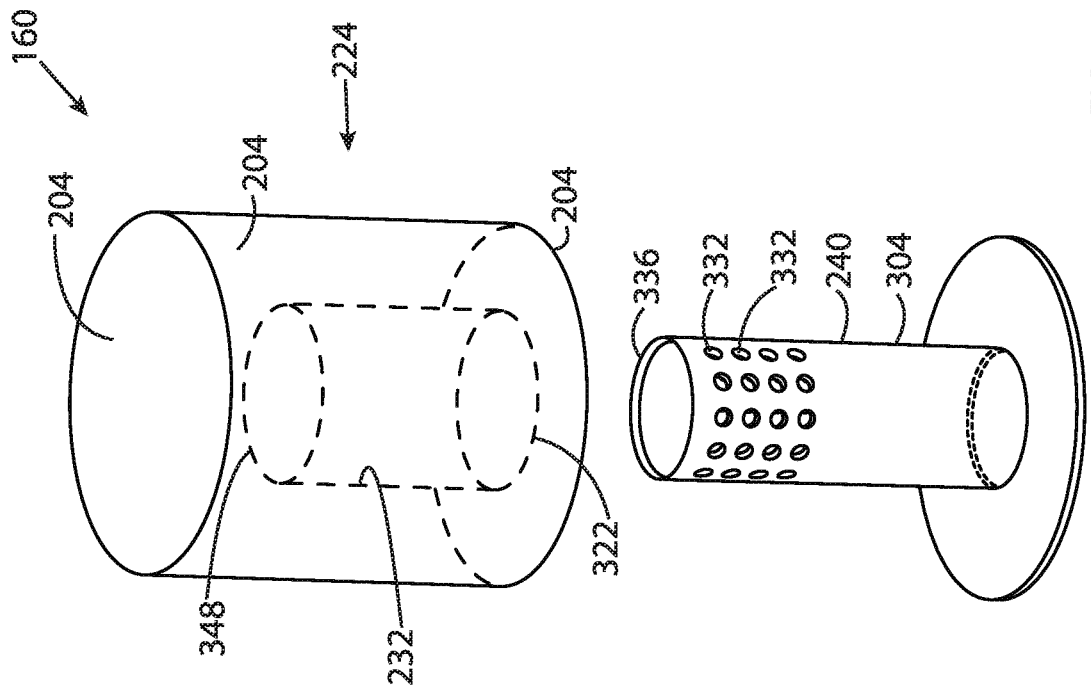
FIG. 35 is an exploded view of the filter member of FIG. 34.
Figure 34:
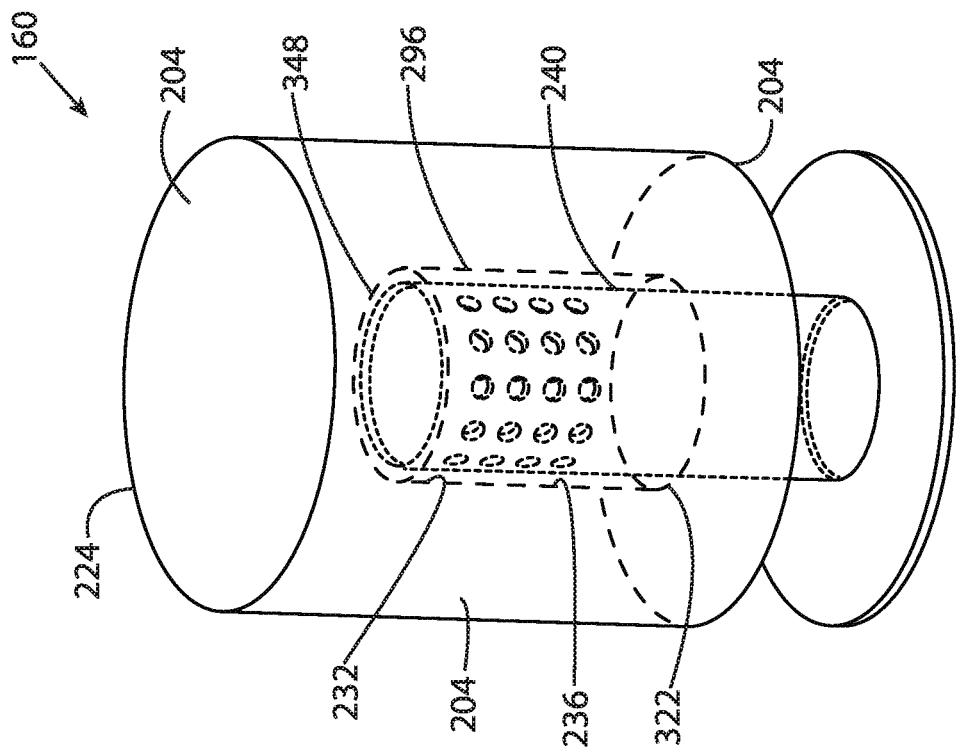
FIG. 34 is a perspective view of a filter member in accordance with another embodiment.
Figure 37:
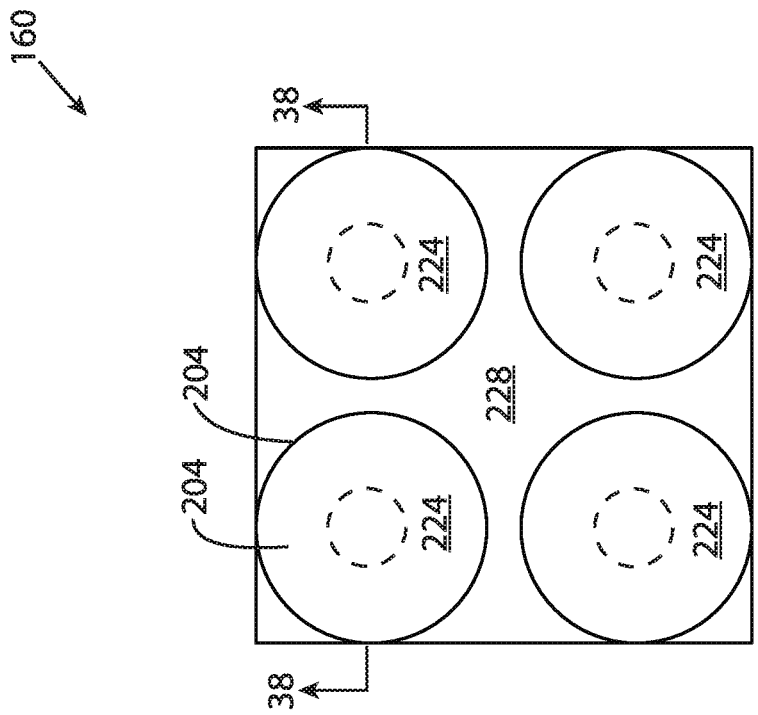
FIG. 37 is a top plan view of the filter member of FIG. 36.
Figure 36:
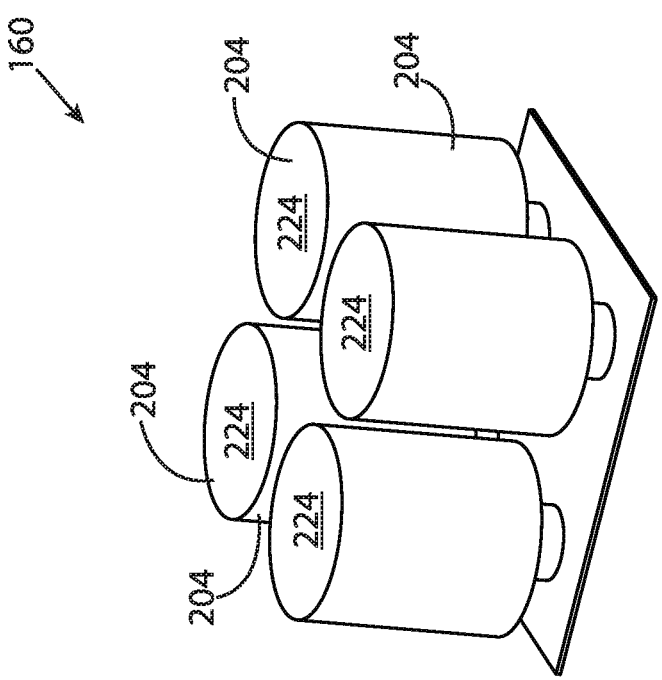
FIG. 36 is a perspective view of a filter member in accordance with another embodiment.
Figure 38:
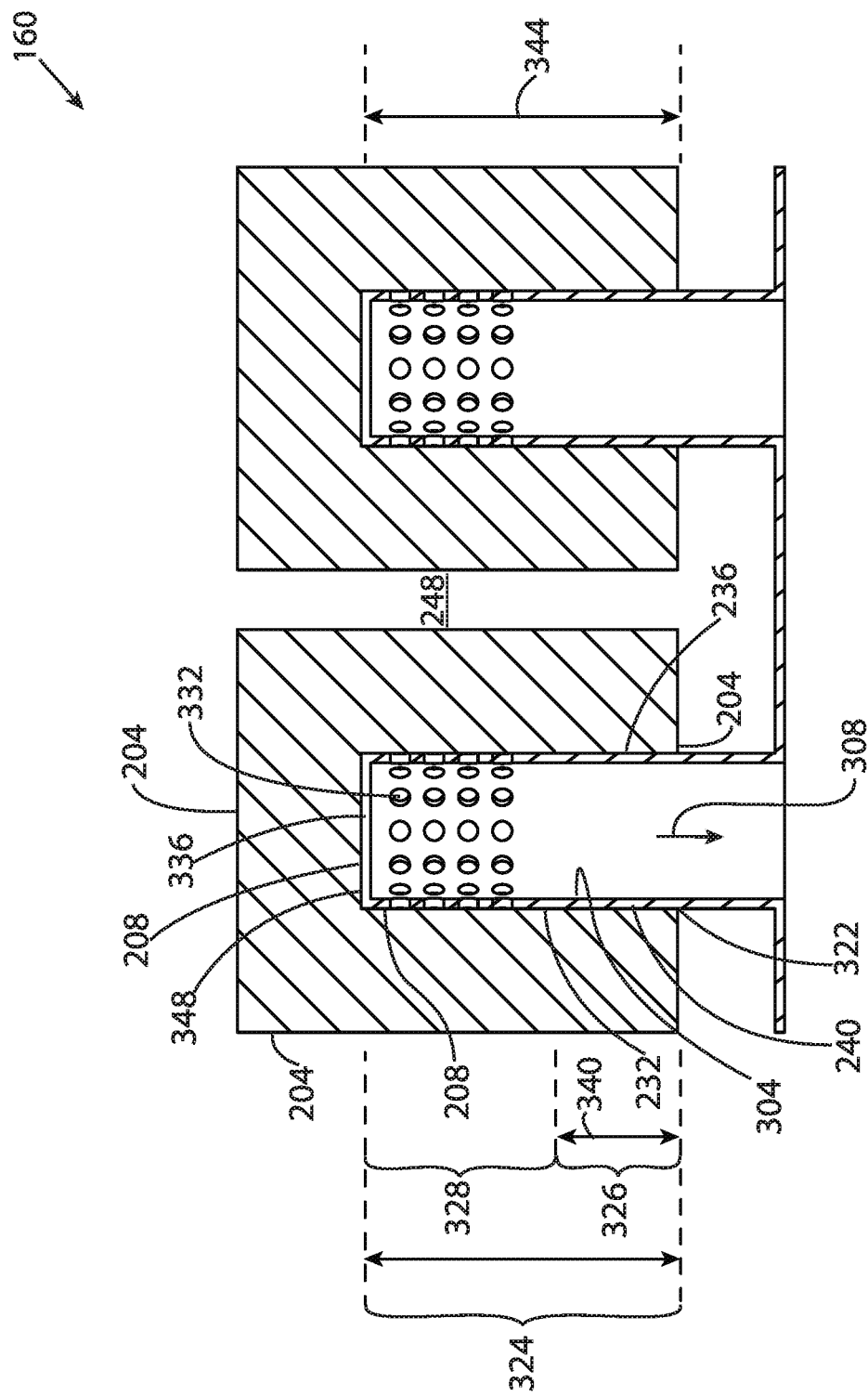
FIG. 38 is a cross-sectional view taken along line 38-38 in FIG. 37.
Figure 40:
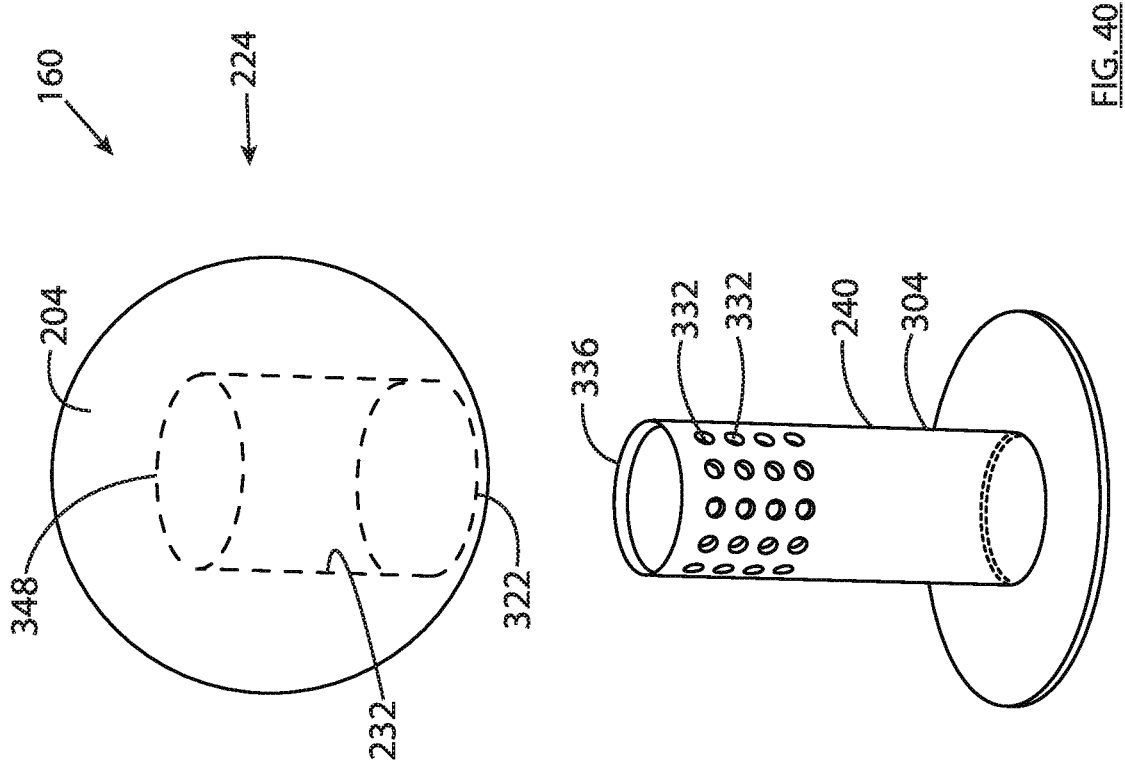
FIG. 40 is an exploded view of the filter member of FIG. 39.
Figure 39:
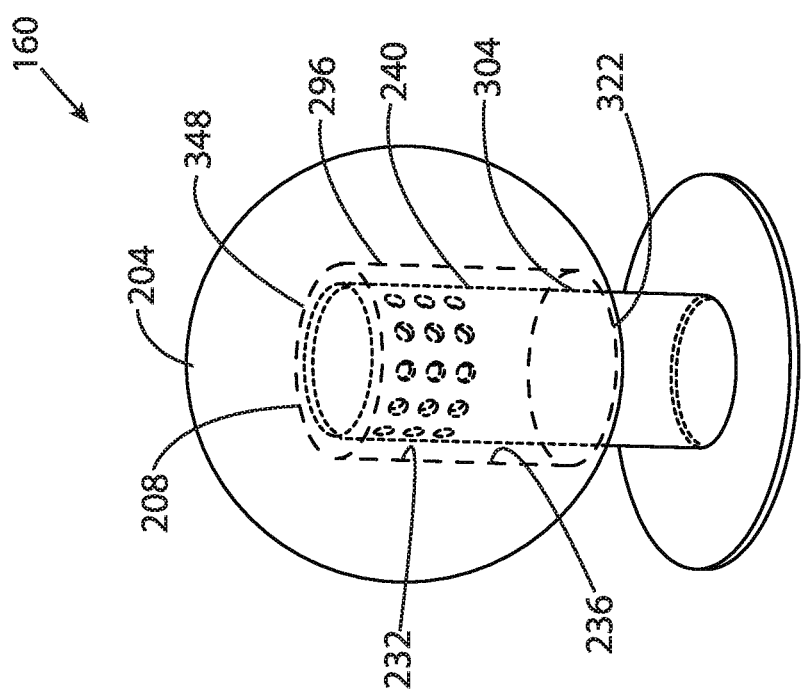
FIG. 39 is a perspective view of a filter member in accordance with another embodiment.
Figure 42:
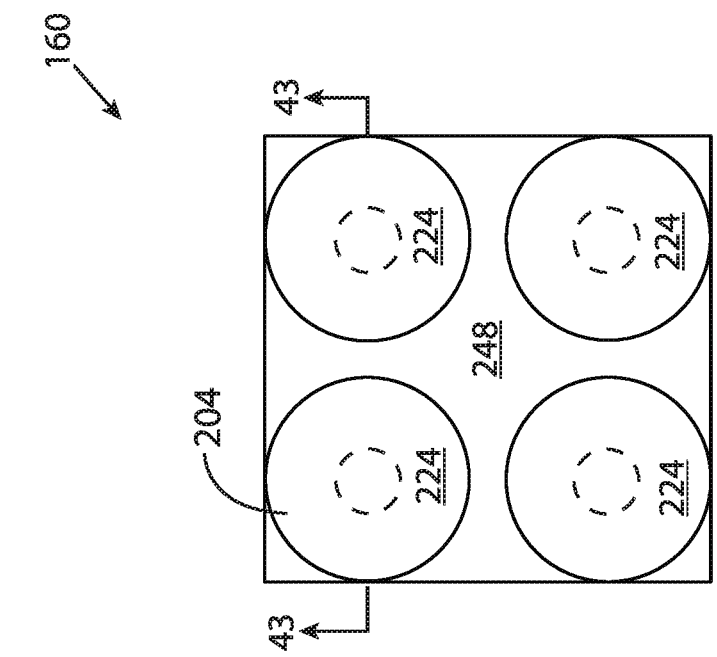
FIG. 42 is a top plan view of the filter member of FIG. 41.
Figure 41:
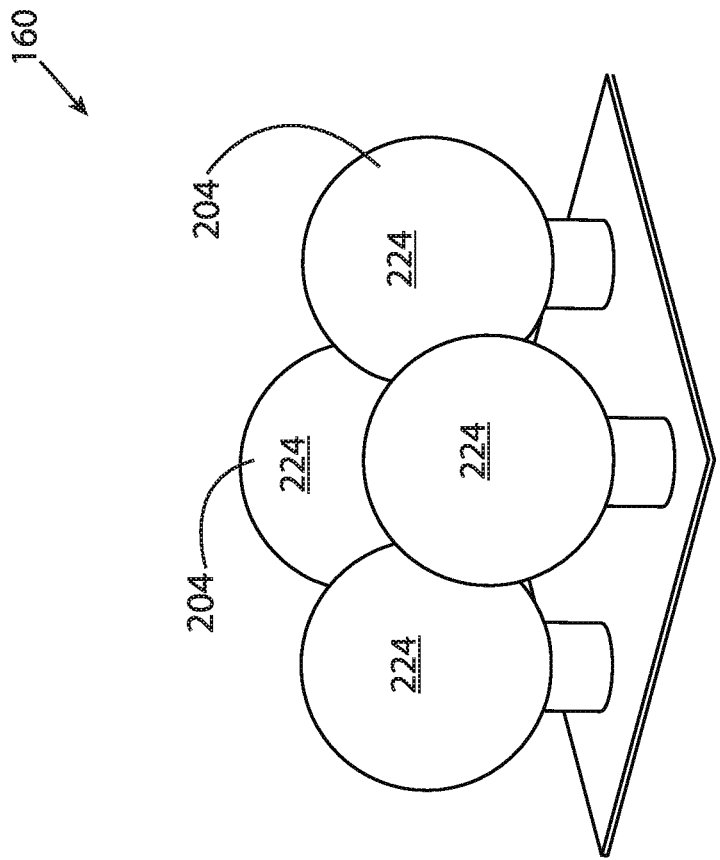
FIG. 41 is a perspective view of a filter member in accordance with another embodiment.
Figure 43:
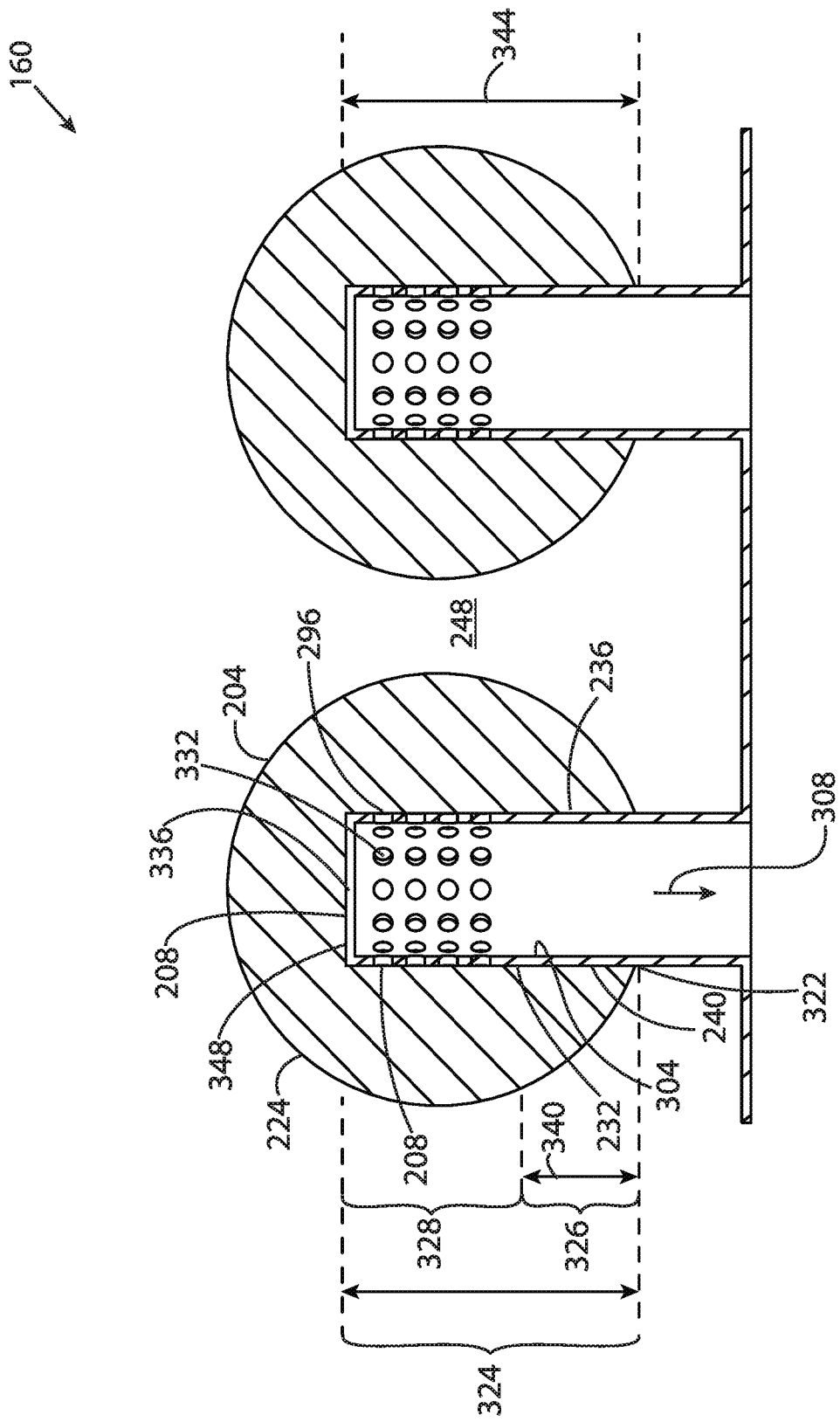
FIG. 43 is a cross-sectional view taken along line 43-43 in FIG. 42.

As demonstrated by the examples illustrated in FIGS. 16-23, there is great flexibility of design in the shape and size of filter member 160, and the number and arrangement of filter elements 224 therein. Turning to FIG. 26, this design flexibility may permit surface cleaning apparatus 100 to accommodate two or more filter members 160 positioned in parallel in the air flow path 124. For example, apparatus 100 may include two or more pre-motor filter members 160 positioned in parallel in the air flow path 124 between air treatment member air outlet 188 and suction motor air inlet 316. In some embodiments, filter members 160 may be sized and shaped to occupy locations in apparatus 100 that may have otherwise been unused void space. An advantage of occupying otherwise unused space with additional filter member(s) 160 is that it may provide greater dirt separation efficiency and less backpressure, all else being equal.

As exemplified in FIG. 26, two filter members 160 are provided, one above air treatment member 116 and one above handle 104. As shown, air exiting air treatment member 116 may divide into two parallel air flow paths $124_1$ and $124_2$. Air flow path $124_1$ is shown extending across pre-motor filter member $160_1$ from air treatment member air outlet 188 to suction motor air inlet 316, and air flow path $124_2$ is shown extending across pre-motor filter member $160_2$ from air treatment member air outlet 188 to suction motor air inlet 316.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A surface cleaning apparatus comprising:
  (a) an air flow path extending from a dirty air inlet to a clean air outlet with an air treatment member and a suction motor positioned in the air flow path;
  (b) a filter housing provided in the air flow path; and,
  (c) a filter member provided in the filter housing, the filter member comprising a plurality of individual filter elements arranged in parallel, each of the individual filter elements comprising porous filter material having at least one upstream face and at least one portion defining a porous filter media air outlet, wherein the at least one upstream face has a larger surface area than the at least one portion,
  wherein an outside gap is provided between at least some of the upstream faces and opposed facing walls of the filter housing and an inside gap is provided between opposed upstream faces, and
  wherein a cross-sectional area of the outside gaps and the inside gaps, in a plane transverse to a direction of air flow through the outside and inside gaps, is at least as large as a cross-sectional area of an air inlet to the air treatment member in a plane transverse to a direction of air flow through the air inlet to the air treatment member.

2. The surface cleaning apparatus of claim 1 wherein the at least one portion is provided on a single downstream face.

3. The surface cleaning apparatus of claim 2 wherein only a portion of the single downstream face is porous.

4. The surface cleaning apparatus of claim 3 wherein an air impermeable material is provided on a portion of the single downstream face.

5. The surface cleaning apparatus of claim 1 wherein the at least one portion is provided on the interior of the porous filter media and the porous filter media has an air outlet passage extending in an air flow direction, the air outlet passage having a sidewall extending in the air flow direction and at least a portion of the air outlet passage is air impermeable.

6. The surface cleaning apparatus of claim 5 wherein an air impermeable material is provided on at least a portion of the sidewall of the air outlet passage.

7. The surface cleaning apparatus of claim 6 wherein the air impermeable material comprises a conduit inserted into the air outlet passage.

8. The surface cleaning apparatus of claim 1 wherein an air impermeable material is provided on a part of the porous filter media surrounding the porous filter media air outlet.

9. The surface cleaning apparatus of claim 1 wherein at least some of the filter elements have a plurality of upstream faces.

10. The surface cleaning apparatus of claim 1 wherein at least some of the individual filter elements are generally polyhedron in shape.

11. The surface cleaning apparatus of claim 1 wherein at least some of the individual filter elements are generally annular in transverse section and are at least partially nested inside each other.

12. A surface cleaning apparatus comprising:
  (a) an air flow path extending from a dirty air inlet to a clean air outlet with an air treatment member and a suction motor positioned in the air flow path; and,
  (b) an individual filter element comprising a porous filter material having a plurality of upstream faces and at least one portion defining a porous filter media air outlet, wherein an air impermeable material is provided on a portion of a single downstream face.

13. The surface cleaning apparatus of claim 12 wherein the at least one portion is provided on a single downstream face.

14. The surface cleaning apparatus of claim 13 wherein only a portion of the single downstream face is porous.

15. The surface cleaning apparatus of claim 12 wherein the at least one portion is provided on the interior of the porous filter media and the porous filter media has an air outlet passage extending in an air flow direction, the air outlet passage having a sidewall extending in the air flow direction and at least a portion of the air outlet passage is air impermeable.

16. The surface cleaning apparatus of claim 15 wherein an air impermeable material is provided on at least a portion of the sidewall of the air outlet passage.

17. The surface cleaning apparatus of claim 16 wherein the air impermeable material comprises a conduit inserted into the air outlet passage.

18. A surface cleaning apparatus comprising:
  (a) an air flow path extending from a dirty air inlet to a clean air outlet with an air treatment member and a suction motor positioned in the air flow path; and,
  (b) a first pre-motor filter part comprising a first plurality of individual filter elements in parallel and located at a first location in the surface cleaning apparatus;
  (c) a second pre-motor filter part comprising a second plurality of individual filter elements in parallel and located at a second location in the surface cleaning apparatus;
  wherein each of the individual filter elements comprises porous filter material having at least one upstream face and at least one portion defining a porous filter media air outlet, wherein the at least one upstream face has a larger surface area than the at least one portion.

19. The surface cleaning apparatus of claim 18 wherein at least some of the individual filter elements are generally polyhedron in shape.

* * * * *